(12) United States Patent
Coffman et al.

(10) Patent No.: US 11,698,623 B2
(45) Date of Patent: Jul. 11, 2023

(54) METHODS AND APPARATUS FOR MACHINE LEARNING PREDICTIONS OF MANUFACTURE PROCESSES

(71) Applicant: Xometry, Inc., Gaithersburg, MD (US)

(72) Inventors: Valerie R. Coffman, Washington, DC (US); Yuan Chen, Rockville, MD (US); Luke S. Hendrix, Bethesda, MD (US); William J. Sankey, College Park, MD (US); Joshua Ryan Smith, Washington, DC (US); Daniel Wheeler, Darnestown, MD (US)

(73) Assignee: Xometry, Inc., Gaithersburg, MD (US)

( * ) Notice: Subject to any disclaimer, the term of this patent is extended or adjusted under 35 U.S.C. 154(b) by 0 days.

(21) Appl. No.: 17/750,549

(22) Filed: May 23, 2022

(65) Prior Publication Data
US 2022/0365509 A1     Nov. 17, 2022

Related U.S. Application Data

(63) Continuation of application No. 16/928,499, filed on Jul. 14, 2020, now Pat. No. 11,347,201, which is a
(Continued)

(51) Int. Cl.
*G05B 19/4097*     (2006.01)
*G06N 20/00*     (2019.01)
(Continued)

(52) U.S. Cl.
CPC ....... *G05B 19/4097* (2013.01); *G05B 19/401* (2013.01); *G06F 30/00* (2020.01);
(Continued)

(58) Field of Classification Search
CPC ... G05B 19/4097–4099; G06N 99/002; G06N 20/00–20
See application file for complete search history.

(56) References Cited

U.S. PATENT DOCUMENTS

| 6,701,200 B1 | 3/2004 | Lukis et al. |
| 6,836,699 B2 | 12/2004 | Lukis et al. |

(Continued)

FOREIGN PATENT DOCUMENTS

| WO | WO 2015/058147 A1 | 4/2015 |
| WO | WO 2015/058152 A1 | 4/2015 |
| WO | WO 2016/018717 A1 | 2/2016 |

OTHER PUBLICATIONS

Extended European Search Report dated Mar. 14, 2018 for European Application No. 17199603.6, 11 pages.
(Continued)

*Primary Examiner* — Amar Movva
(74) *Attorney, Agent, or Firm* — BakerHostetler

(57) ABSTRACT

The subject technology is related to methods and apparatus for discretization and manufacturability analysis of computer assisted design models. In one embodiment, the subject technology implements a computer-based method for the reception of an electronic file with a digital model representative of a physical object. The computer-based method determines geometric and physical attributes from a discretized version of the digital model, a cloud point version of the digital model, and symbolic functions generated through evolutionary algorithms. A set of predictive machine learning models is utilized to infer predictions related to the manufacture process of the physical object.

2 Claims, 13 Drawing Sheets

Related U.S. Application Data continuation of application No. 16/786,454, filed on Feb. 10, 2020, now Pat. No. 10,712,727, which is a continuation of application No. 16/395,940, filed on Apr. 26, 2019, now Pat. No. 10,558,195, which is a continuation of application No. 16/046,519, filed on Jul. 26, 2018, now Pat. No. 10,274,933, which is a continuation of application No. 15/340,338, filed on Nov. 1, 2016, now Pat. No. 10,281,902.

(51) Int. Cl.
*G05B 19/401* (2006.01)
*G06F 30/00* (2020.01)
*G06N 20/20* (2019.01)
*G06N 5/04* (2023.01)

(52) U.S. Cl.
CPC ............... *G06N 5/04* (2013.01); *G06N 20/00* (2019.01); *G06N 20/20* (2019.01); *G05B 2219/35134* (2013.01); *G05B 2219/35499* (2013.01); *Y02P 90/02* (2015.11)

(56) References Cited

U.S. PATENT DOCUMENTS

| | | |
|---|---|---|
| 6,937,966 B1 | 8/2005 | Hellerstein et al. |
| 7,089,082 B1 | 8/2006 | Lukis et al. |
| 7,305,367 B1 | 12/2007 | Hollis et al. |
| 7,496,528 B2 | 2/2009 | Lukis et al. |
| 7,590,466 B2 | 9/2009 | Lukis et al. |
| 7,630,783 B2 | 12/2009 | Walls-Manning et al. |
| 7,735,033 B2 | 6/2010 | Zhang et al. |
| 7,840,443 B2 | 11/2010 | Lukis et al. |
| 8,140,401 B2 | 3/2012 | Lukis et al. |
| 8,239,284 B2 | 8/2012 | Lukis et al. |
| 8,560,092 B2 | 10/2013 | Zheng et al. |
| 8,601,483 B2 | 12/2013 | He et al. |
| 9,141,743 B1 | 9/2015 | McCracken et al. |
| 9,367,063 B2 | 6/2016 | Herman et al. |
| 9,441,936 B2 | 9/2016 | Pinkston et al. |
| 10,061,300 B1 | 8/2018 | Coffman et al. |
| 10,073,439 B1 | 9/2018 | Jacobs, II et al. |
| 10,545,481 B2 | 1/2020 | Jacobs, II |
| 10,558,195 B2 | 2/2020 | Coffman et al. |
| 10,712,727 B2 | 7/2020 | Coffman et al. |
| 2003/0083757 A1 | 5/2003 | Card et al. |
| 2006/0224325 A1 | 10/2006 | Conway et al. |
| 2007/0038531 A1 | 2/2007 | Lukis et al. |
| 2007/0112526 A1 | 5/2007 | Chen |
| 2008/0183446 A1 | 7/2008 | Hansen |
| 2008/0231307 A1 | 9/2008 | Bickford et al. |
| 2009/0228846 A1 | 9/2009 | McConaghy et al. |
| 2009/0307638 A1 | 12/2009 | McConaghy et al. |
| 2014/0125663 A1 | 5/2014 | Zhang et al. |
| 2015/0127480 A1 | 5/2015 | Herrman et al. |
| 2015/0317589 A1 | 11/2015 | Anderson et al. |
| 2016/0033251 A1 | 2/2016 | Pinkston et al. |
| 2016/0140452 A1 | 5/2016 | Garcia et al. |
| 2016/0259323 A1 | 9/2016 | Herman et al. |
| 2016/0370790 A1 | 12/2016 | Pinkston et al. |
| 2017/0293269 A1 | 10/2017 | Sharma et al. |
| 2018/0046926 A1 | 2/2018 | Achin et al. |
| 2018/0120813 A1 | 5/2018 | Coffman et al. |
| 2019/0202133 A1 | 7/2019 | Jacobs, II et al. |

OTHER PUBLICATIONS

Ip, C. Y. & Regli, W. C., "A 3D object classifier for discriminating manufacturing processes," Computers and Graphics, vol. 30, No. 6, pp. 903-916 (2006).

Loyer, J.-L. et al., "Comparison of Machine Learning methods applied to the estimation of manufacturing cost of jet engine components," Int. J. Production Economics, vol. 178, pp. 109-119 (2016).

Non-Final Office Action dated Feb. 12, 2018 for U.S. Appl. No. 15/721,208, 7 pages.

Serrat, J. et al., "Cost estimation of custom hoses from STL files and CAD drawings," Computers in Industry, vol. 64, No. 3, pp. 299-309 (2013).

Non-Final Office Action dated Nov. 21, 2018 for U.S. Appl. No. 15/340,338, 11 pages.

Non-Final Office Action dated Dec. 26, 2018 for U.S. Appl. No. 16/113,835, 13 pages.

U.S. Appl. No. 16/113,835; Non-Final Office Action; dated Dec. 4, 2018; 8 pages.

Shtub et al.; "A neural-network-based approach for estimating the cost of assembly systems"; Int'l Journal of Production Economics; vol. 32; 1993; p. 189-207.

Zhang et al.; "A Neural Network Approach For Early Cost Estimation of Packaging Products" Computers in Industrial Engineering; vol. 34; 1998; p. 433-450.

Boothroyd et al.; "Approximate Cost Estimates for Typical Turned Parts"; Journal of Manufacturing Systems; vol. 8; 1989; p. 185-193.

Feng et al.; "Cost evaluation in design with form features"; Computer-Aided Design; vol. 28; 1996; p. 879-885.

Wang et al.; "Cost model development using artificial neural networks"; Aircraft Engineering and Aerospace Technology; vol. 73; 2001; p. 536-541.

Joshi et al.; "Graph-based heuristics for recognition of machined features from a 3D solid model"; Computer-Aided Design; vol. 20; 1988; p. 58-66.

JJ Shah; Assessment of features technology; Computer-Aided Design; vol. 23; Jun. 1991; p. 331-343.

Henderson, Mark R.; "Extraction of Feature Information From Three-Dimensional CAD Data"; Thesis; Purdue University; 1984; 159 pages.

Kung, Hsiang-Kuan; "An Investigation Into The Development of Process Plans From Solid Geometric Modeling Representation"; Thesis; Oklahoma State University; 1984; 274 pages.

Yao et al.; "A Geometric Algorithm for Finding the Largest Milling Cutter"; Journal of Manufacturing Processes; vol. 3; 2001; 16 pages.

Vandenbrande et al.; "Spatial Reasoning for the Automatic Recognition of Machinable Features in Solid Models"; IEEE Transactions on Pattern Analysis and Machine Intelligence; vol. 15; Dec. 1993; p. 1269-1285.

De la Garza et al.; "Neural networks versus parameter-based applications in cost estimating"; Cost Engineering; vol. 37; Feb. 1995; p. 14-18.

Kyprianou LK; "Shape classification in computer-aided design"; Thesis; University of Cambridge; 1982; (abstract only).

METHODS AND APPARATUS FOR MACHINE LEARNING PREDICTIONS OF MANUFACTURE PROCESSES

CROSS REFERENCE TO RELATED APPLICATIONS

This application is a continuation of U.S. patent application Ser. No. 16/928,499, which was filed on Jul. 14, 2020, which is a continuation of U.S. patent application Ser. No. 16/786,454, which was filed on Feb. 10, 2020 and issued at U.S. Pat. No. 10,712,727 and which is a continuation of U.S. patent application Ser. No. 16/395,940, which was filed on Apr. 26, 2019 and issued as U.S. Pat. No. 10,558,195 and which is a continuation of U.S. patent application Ser. No. 16/046,519, which was filed on Jul. 26, 2018 and issued as U.S. Pat. No. 10,274,933 and which is a continuation of and claims priority to U.S. patent application Ser. No. 15/340,338, which was filed Nov. 1, 2016 and issued as U.S. Pat. No. 10,281,902. The disclosures of each of the foregoing patents and patent applications are incorporated herein by reference in their entireties.

TECHNICAL FIELD

The present disclosure relates generally to manufacture processes, and more particularly to the processing of digital models for manufacture processes through machine learning and artificial intelligence techniques.

BACKGROUND

Often, product manufacturers receive customer orders specified in electronic files including Computer Assisted Design (CAD) models. A need exists for methods and apparatus to support the prediction of appraisals and production alternatives related to manufactured products, including times, manufacture methods, and costs incurred in manufacture processes. Many manufacture companies rely on human experience alone or have no standardized methodologies to predict appraisals and other aspects associated with the manufacture of products. Relying on human experience alone can result in inaccurate and can lead to inconsistencies across appraisals and other predictions made by different human estimators with respect to similar or identical products. Moreover, the lack of reliable objective manufacture appraisal and prediction tools capable to operate in near real-time can significantly contribute to the overhead of manufacture of products.

Thus, a need exists for methods and apparatus for discretization and reliable manufacture analysis tools to accurately predict aspects associated with the production of products specified in CAD or other digital-based models.

DETAILED DESCRIPTION OF ILLUSTRATIVE EMBODIMENTS

Figure 1:
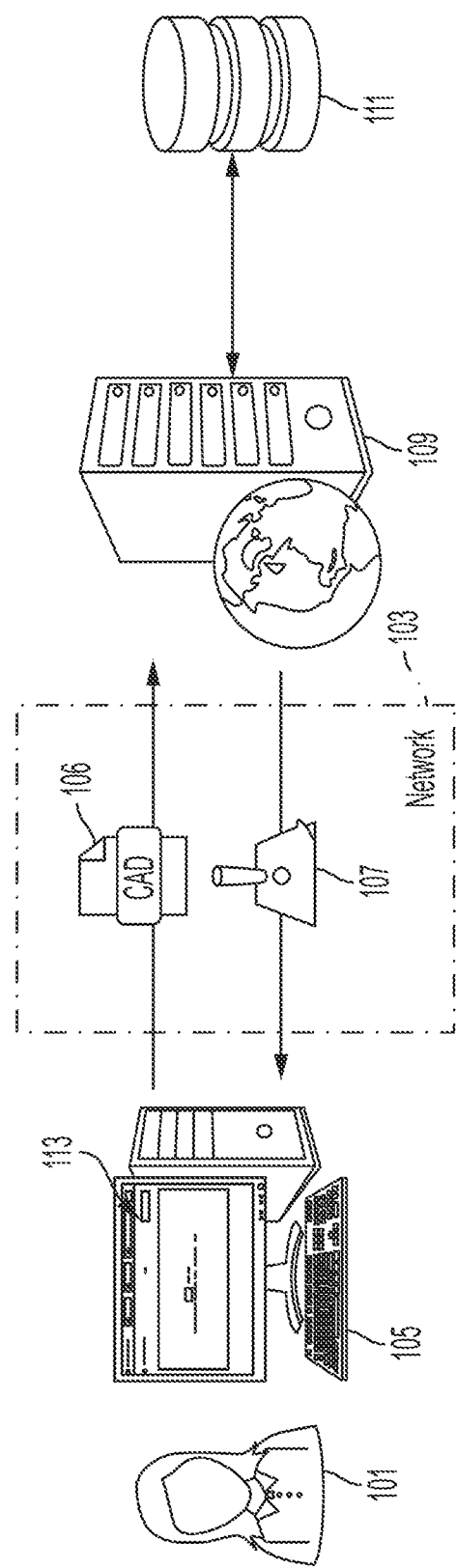
FIG. 1 is a schematic diagram of a predictive system for manufacture processes operatively coupled to a client compute device, according to an embodiment.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. It, however, will be clear and apparent that the subject technology is not limited to the specific details set forth herein and may be practiced without these specific details. In some instances, well-known structures and components are shown in block diagram form to avoid obscuring the concepts of the subject technology.

The terms "computer", "processor", "computer processor", "compute device" or the like should be expansively construed to cover any kind of electronic device with data processing capabilities including, by way of non-limiting example, a digital signal processor (DSP), a microcontroller, a field programmable gate array (FPGA), an application specific integrated circuit (ASIC), or any other electronic computing device comprising one or more processors of any kind, or any combination thereof.

As used herein, the phrase "for example," "such as", "for instance" and variants thereof describe non-limiting embodiments of the presently disclosed subject matter.

Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

The subject technology is related to methods and apparatus for discretization and manufacturability analysis of computer assisted design models. In one embodiment, the subject technology implements a computer-based method for the reception of an electronic file with a digital model representative of a physical object, for example, a mechanical part or other suitable object. The computer-based method includes a discretization process of the digital model to determine a first set of parameters associated with physical attributes of the physical object. The first set of parameters includes any of a volume of the physical object, a data value corresponding to a surface area of the physical object, a 3-tuple data structure with a length value, a width value, and a height value associated with a prism enclosing the digital model, a 3-tuple data structure with coordinate data values of a center of the prism, a data value corresponding to a volume of a convex hull enclosing the digital model, a data value corresponding to a number of holes associated with the physical object (i.e., genus), and/or other suitable parameters described herein.

The computer-based method further includes a determination of a second set of parameters associated with physical attributes of the physical object. The determination is based on three-dimensional coordinates associated with the physical object. The second set of parameters includes any of a data value corresponding to a measure of the physical object calculated based on orientation of at least one surface of the physical object, any of a data value corresponding to a measure of the physical object calculated based on symmetric attributes associated with the physical object, and any of a data value corresponding to a measure of the physical object calculated based on distances between surfaces of the physical object.

The computer-based method infers, based on the second set of parameters and at least on one machine learning model, a set of axioms associated with a manufacture process of the physical object. Such a set of axioms define characteristics of the physical object related to specific manufacture processes and/or techniques. A set of predicted outcomes associated with an overall manufacture process of the physical object is then determined based on the set of axioms. In another embodiment, the subject technology implements a computer-based method for the reception of an electronic file with a digital model representative of a physical object, for example, a mechanical part or other suitable object. The computer-based method includes a discretization process of the digital model to determine a first set of parameters associated with physical attributes of the physical object. The first set of parameters includes any of a data value corresponding to a measure of the physical object calculated based on, dimensional analysis of the discretized digital model, orientation of at least one surface of the physical object, any of a data value corresponding to a measure of the physical object calculated based on symmetric attributes associated with the physical object, and any of a data value corresponding to a measure of the physical object calculated based on distances between surfaces of the physical object.

The computer-based method further includes a determination of a second set of parameters associated with physical attributes of the physical object. The determination is based on the first set of parameters and a set of symbolic functions derived from an evolutionary computation model. The second set of parameters corresponds to physical attributes of the physical object. The second set of parameters includes any of a data value corresponding to a measure of the physical object calculated based on orientation of at least one surface of the physical object, any of a data value corresponding to a measure of the physical object calculated based on symmetric attributes associated with the physical object, and any of a data value corresponding to a measure of the physical object calculated based on distances between surfaces of the physical object.

The computer-based method infers based on the second set of parameters, and at least on one machine learning model, a set of axioms associated with a manufacture process of the physical object. Such a set of axioms define characteristics of the physical object related specific manufacture processes and/or techniques. A set of predicted outcomes associated with an overall manufacture process of the physical object is then determined based on the set of axioms.

Advantageously, the subject technology provides manufacture predictions in near real-time. Specifically, in some instances, the time delay introduced by the compute device implementing the computer-based methods and network transmissions described herein is on a millisecond order between 150 ms and 1000 ms. Thus, the responsiveness of the computer-based method is immediate and perceived as a part of a mechanical action (e.g., a request submitted via a user interface) made by a user.

The subject technology provides objective, accurate, and consistent classifications and/or predictions regarding manufacturing process, including estimated times, optimal costs, comparisons of fabrication materials, and other suitable information. The classifications and/or predictions are reliable; that is, assessments for the manufacture of similar products result in similar or equivalent outcomes. The subject technology operates in near real-time and thus, optimizes manufacturing process by decreasing overhead associated with human-based estimations.

FIG. 1 is a schematic diagram of a predictive system for manufacture processes operatively coupled to a client compute device, according to an embodiment. Such a Predictive System for Manufacture Processes (hereinafter PSMP) 109 can provide predictions or estimations in near real-time regarding manufacturing processes associated with a physical object, for example, a mechanical part, an ornament, an electronic device, or other suitable physical object conveyed in an electronic file such as a CAD file, a scanned copy of a model drafted by hand, and/or other electronic files graphically describing a model of a physical object. In some instances, a local user (not shown in FIG. 1) can connect directly to the PSMP system 109, in other instances a remote user 101 can connect to the PSMP system via a network, for example, network 103.

Network 103 can include one or more types of communication networks. For example communication networks can include, the Internet, a local area network (LAN), a wide area network (WAN), a metropolitan area network (MAN), various types of telephone networks (including, for example, Public Switch Telephone Network (PSTN) with Digital Subscriber Line (DSL) technology) or mobile networks (including for example Global System Mobile (GSM) communication, General Packet Radio Service (GPRS), Code Division Multiple Access (CDMA), and other suitable mobile network technologies), or any combination thereof. Communication within the network can be realized through any suitable connection (including wired or wireless) and communication technology or standard (wireless fidelity (WiFi®), 4G, long-term evolution (LTE™), or other suitable standard).

Compute device 105 can be configured with one or more computer processors and a computer memory (including transitory computer memory and/or non-transitory computer memory), configured to perform various data processing operations. Compute device 105 also includes a network communication interface (not shown) to connect to PSMP server 109 via network 103 and other suitable electronic components. Examples devices represented by compute device 105 can include a personal computer, portable computer, smartphone, tablet, notepad, dedicated server computer devices, any type of communication device, and/or other suitable compute devices. As described in further detail herein, in some instances, compute device 105 can be connected to network 103 via an intranet, an Internet Service Provider (ISP) and the Internet, a cellular network, and/or other suitable network communication technology.

PSMP server 109 can include one or more computer processors and computer memories (including transitory computer memory and/or non-transitory computer memory), which are configured to perform various data processing and communication operations associated with prediction and estimation of manufacture process of physical objects. In general, PSMP server 109 receives and processes prediction requests and electronic files received from compute device 105. Further components of PSMP server 109 are discussed with reference to FIG. 2.

In some implementations, storage device 111 can be physically integrated to PSMP server 109; in other implementations, storage device 111 can be a repository such as a Network-Attached Storage (NAS) device, an array of hard-disks, a storage server or other suitable repository separate from PSMP server 109. In some instances, storage device 111 can include trained machine-learning models configured to predict manufacture appraisals, processes, events; such machine-learning models are trained with data collected over time to optimize one or more machine learning models after deployment. Storage device 111 can also include sets of computer executable instructions to apply symbolic functions over parameters or attributes calculated from digital models, datasets with grounded axioms generated through estimations or predictions derived from digital model, and other suitable type of executable-instruction and data associated with the manufacture of a physical object.

In some instances, user 101 can access the services provided by PSMP server 109 through compute device 105 by, for example, entering on a web browser a Uniform Resource Locator (URL) corresponding to a domain hosted by PSMP server 109. Accordingly, a web page with GUI 113 is displayed on compute device 105. User 101 can upload CAD file 106 to PSMP server 109 via network 103 with one or more prediction requests associated with the manufacture of a physical object represented in a digital format within CAD file 106. Upon reception of CAD file 106, PSMP server 109 executes one or more processes depending on requests submitted by user 101. In some instances, PSMP server 109 can fetch or retrieve one or more data structures, executable machine-learning models, and other suitable data and/or executable instructions from a knowledge base stored in storage device 111. Accordingly, PSMP server 109 processes the prediction request(s) and sends prediction report 107 to compute device 105 via network 103 in near real-time.

Figure 2:
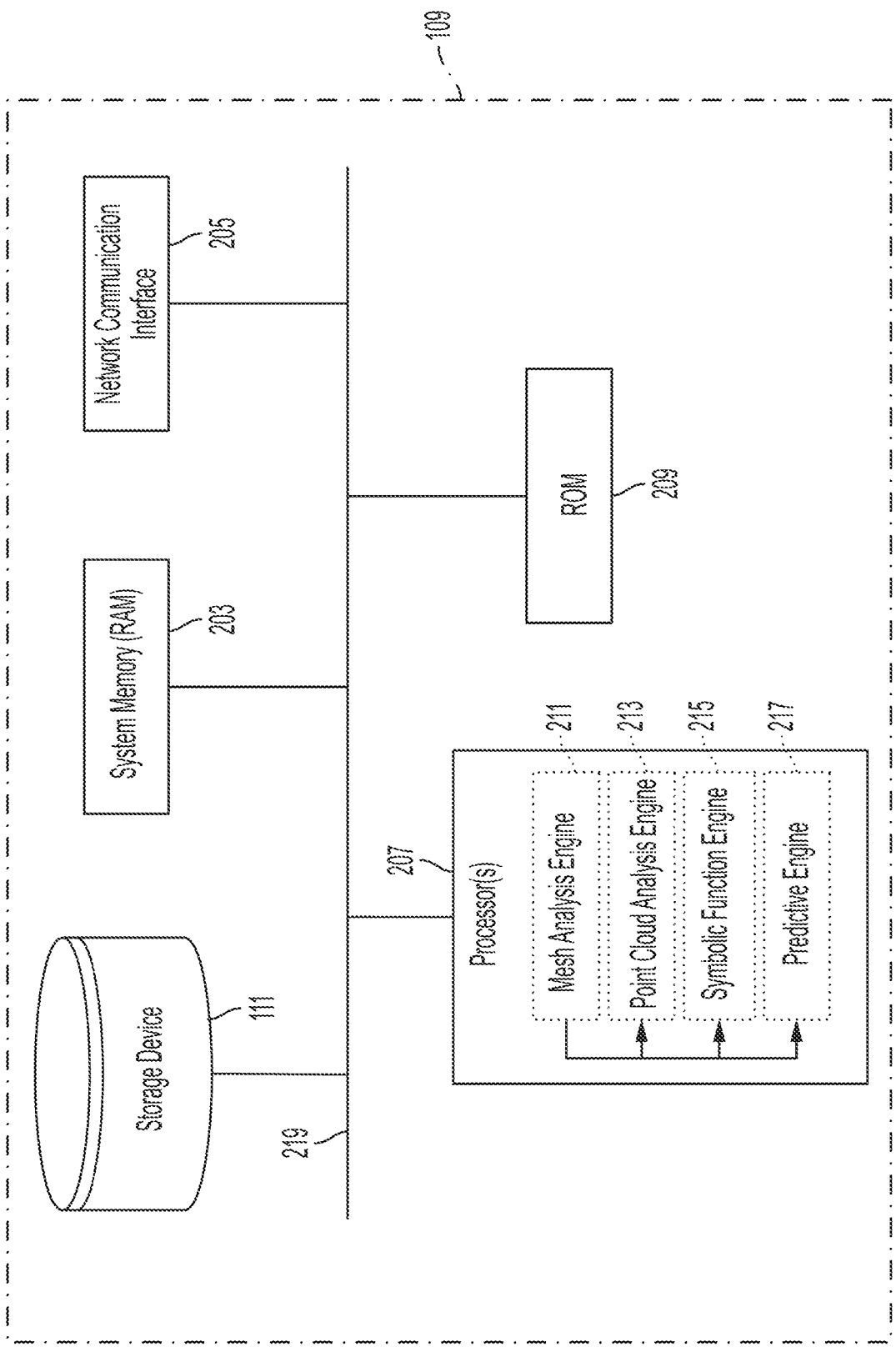
FIG. 2 is a schematic block diagram illustrating a predictive storage device, a mesh analysis engine, a point cloud analysis engine, a symbolic function engine, a predictive engine, memories, and a network communication interface of a predictive system for manufacture processes, according to an embodiment.

FIG. 2 is a schematic block diagram illustrating a predictive storage device, a mesh analysis engine, a point cloud analysis engine, a symbolic function engine, a predictive engine, memories, and a network communication interface included in PSMP server 109 according to an embodiment. In some implementations, PSMP server 109 can be a compute device, such as a hardware platform server configured to support mobile applications, Software as a Service (SaaS) applications, a web site, and/or other suitable applications accessible to client compute device 105 in FIG. 1.

The bus 219 collectively represents system, peripheral, and/or chipset buses that communicatively connect numerous internal devices of the PSMP server 109. For instance, bus 219 communicatively couples processor 207 with read-only memory 209, system memory (RAM) 203, and storage device 111. From these various memory units, processor 207 can retrieve instructions to execute and/or data to perform processes for discretization, manufacturability analysis, and predictions of CAD models. In some implementations, processor 207 can be a single processor, a multi-core processor, a master-slave processor arrangement or other suitable compute processing device. In some implementations, processor 207 can be any suitable processor such as, for example, a general purpose processor, a field programmable gate array (FPGA), an application specific integrated circuit (ASIC) and/or other suitable hardware device.

Figure 3:
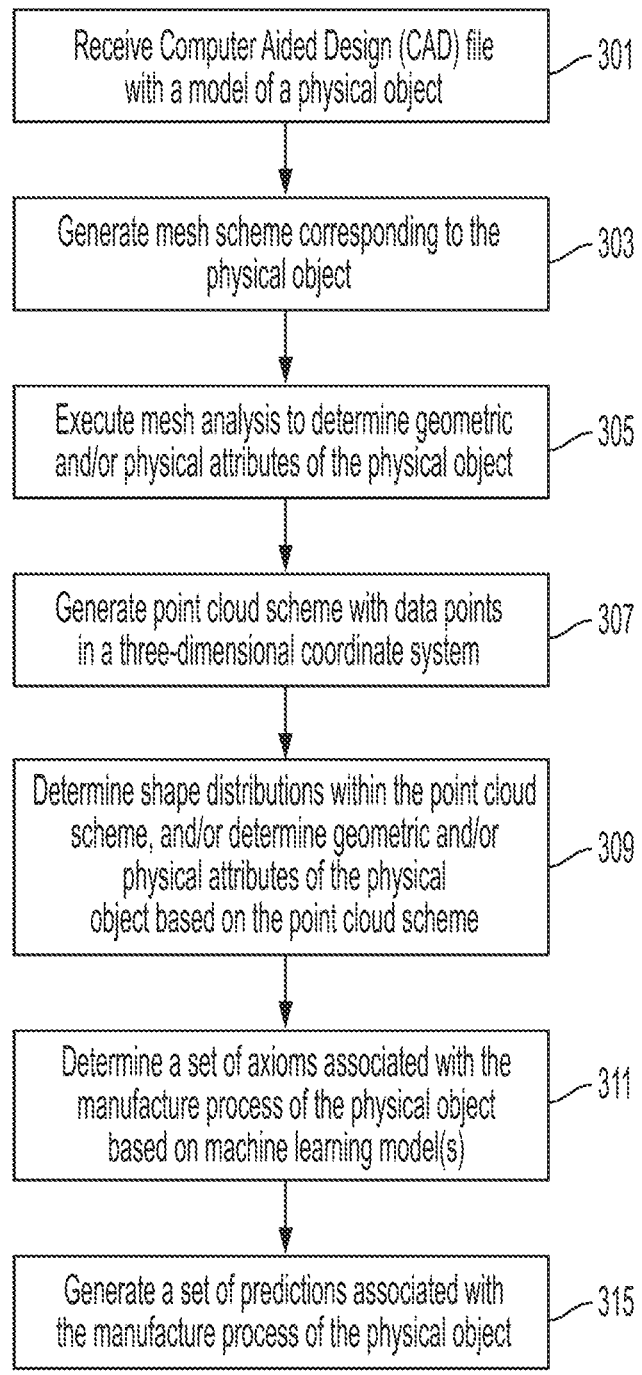
FIG. 3 is a flowchart illustrating a method to generate a set of predictions associated with manufacture processes of a physical object, according to an embodiment.

PSMP server 109 can further include physical compute devices not shown in FIG. 3 (e.g., load balancer device, cluster of messaging servers and cluster of RTC servers) residing at a particular location or deployed in a cloud computing network environment. A cloud computing network environment enables ubiquitous, convenient, on-demand network access to a shared pool of configurable compute resources (e.g., networks, servers, storage, applications, and services) that can be rapidly provisioned via, for instance, virtualization and released with minimal management effort or service provider interaction, and then scaled accordingly. A cloud model can be composed of various characteristics (e.g., on demand self-service, broad network access, resource pooling, rapid elasticity, and measured service), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.)

In some implementations, PSMP server 109 can include any combination of one or more computer-usable or computer-readable media. For example, PSMP server 109 can contain computer-readable medium including system memory or random access memory (RAM) device 203, a read-only memory (ROM) device 209, a magnetic storage device 111 and other suitable memory devices. In some implementations, PSMP server 109 can include a general purpose processor and/or on one or more specialized processors configured to execute and optimize the processing tasks performed by mesh analysis engine 211, point cloud analysis engine 213, symbolic function 215, predictive engine 215, and other processes executed by processor 207.

Mesh analysis engine 211, point cloud analysis engine 213, symbolic function engine 215 and predictive engine 217 can be implemented as hardware, software and/or a combination of hardware and software. For example, storage device 111 (or other suitable memory coupled to processor 207 or PSMP server 109) can include processor-executable instructions and/or data to configure processor 207 to execute the tasks performed by engines 211, 213, 215 and 217. Accordingly, in some instances, processor 207 can retrieve processor executable instructions and data to execute various PSMP processes from one or more of the memory units shown in FIG. 2.

Mesh analysis engine 211 executes discretization processes of digital models and computations of geometrical and physical properties of a physical object represented by the digital model. For example, mesh analysis engine 211 can compute and/or process data corresponding to a discretized version a digital model. Such a discretized version includes explicit surface representations of a digital model defined as a continuous piecewise linear surface composed by simplicial elements, for instance, triangles, polygons, and other suitable simplicial elements. Mesh analysis engine 211 includes computer executable instructions to calculate geometric and physical properties associated with a digital model including but not limited to, Euler characteristics (i.e., vertices, edges, and faces), oriented bounding box, center of mass, curvature estimation, symmetry, and other suitable properties. In some implementations, mesh analysis engine 211 includes processor executable instructions for discretization of digital models having arbitrary shapes and processor executable instructions to determine attributes from such discretized representations of digital models. Further details with respect to mesh analysis engine 211 are discussed with reference to FIG. 3.

Point cloud analysis engine 213 computes a three dimensional (3D) point cloud processes of a digital model and calculates geometrical and physical properties of a physical object derived from such a point cloud. For example, point cloud analysis engine 213 can instantiate and process a data structure with a set of 3D coordinates representing the digital model (i.e., point cloud). Some data structures to define point clouds include vectors of values with unique indexes corresponding to each point, octrees, and other suitable data structures. Such a set of 3D coordinates defines a point cloud corresponding to the digital model.

Point cloud analysis engine 213 executes one or more processes to calculate implicit or volumetric properties from a point cloud. Such processes include but are not limited to processes based on functions to determine continuous algebraic surfaces, radial basis processes, functions to define discrete voxelizations of a digital model (i.e., discretization of a 3D digital model into discrete elements of volume that constitute a 3D space corresponding to a physical object), and other suitable implicit and volumetric functions. In some further implementations, point cloud analysis engine 213 includes computer executable instructions to calculate geometric and physical properties associated with a digital model including but not limited to, symmetric and asymmetric properties of a physical object represented in the digital model, distances between surfaces of a physical object represented in the digital model, and other suitable properties. In some further implementations, cloud point analysis engine 213 includes processor executable instructions for defining implicit or volumetric representations of 3D models having arbitrary geometric shapes and processor executable instructions for determining attributes from such implicit or volumetric representations. Further details with respect to point cloud analysis engine 213 are discussed with reference to FIG. 3.

Symbolic function engine 215 processes a set of symbolic functions determined based on evolutionary computation models trained with samples including a representative collection of digital models of a domain of mechanical parts, products, or other suitable physical objects. Such a set of symbolic functions can be stored in a corresponding set of data structures and/or processor executable instructions in a local memory or other memory operationally coupled to symbolic function engine 215. Accordingly, symbolic function engine 215 can determine functional forms and/or approximations of targeted functions, describing physical and/or geometric attributes of a physical object represented in a digital model. For example, symbolic function engine 215 can determine polynomial terms, cross terms, transcendental functions, and other suitable symbolic function elements to identify shapes of a digital model.

In some instances, when a matching error rate between, for example, mesh scheme attributes and a set of symbolic functions retrieved from memory reaches a predetermined threshold, symbolic function engine 215 can execute one or more processes to retrain evolutionary computation models such that the matching error rate is decreased to an acceptable level. Accordingly, symbolic generator engine 215 can adapt or learn while in production after analyzing values of datasets that are substantially different from values of datasets included used as training sets of the evolutionary model. In some instances, complex physical attributes can be generated based directly on data provided in a digital model, or data generated by another engine (for example mesh analysis engine 211 and/or point cloud analysis engine 213), via the symbolic function models included in symbolic function engine 215. Further details with respect to symbolic function 215 are discussed with reference to FIG. 3 and FIG. 9.

Predictive engine 217 includes a set of trained machine-learning models and other suitable computation models to infer axioms regarding a physical object represented in a digital model. Predictive engine 217 can take as input one or more attributes included in a digital model or attributes or parameters generated by the mesh analysis machine engine 211, point cloud analysis engine 213, and/or symbolic function 215. Thus, in some instances, predictive engine 217 can infer sufficient axioms to determine predictions by processing outputs generated by one or more of mesh analysis engine 211, point cloud engine 213, symbolic function 215, and/or data included in the electronic file with the digital object. Predictive engine 217 also includes a knowledge aggregator and reasoning engine (not shown in FIG. 2) that process inferred axioms to determine predictions associated with the manufacture process of a physical object represented in a digital model. Further details of predictive engine 217 are discussed with reference to FIG. 6.

Bus 219 can also couple PSMP server 109 to network 103 shown in FIG. 1 through a network communication interface 205. Network communication interface 205 can include one or more wireless transceivers for performing wireless communication and/or one or more communication ports for performing wired communication. In some implementations, network communication interface 205 can be configured to transmit digital prediction reports in response to requests of manufacture processes prediction reports sent by remote compute devices. In this manner, PSMP server 109 can be part of a network of computers (for example a local area network ("LAN"), a wide area network ("WAN"), or an Intranet, or a network of networks, for example the Internet.

In some implementations, PSMP server 109 includes an output device interface not shown in FIG. 2, for example, printers, audio devices (e.g., speakers), haptic output devices, and display devices (e.g., cathode ray tubes (CRT), liquid crystal displays (LCD), gas plasma displays, touch screen monitors, capacitive touchscreen and/or other suitable display device). Some implementations include devices that function as both input and output devices (e.g., a touchscreen display). Accordingly, a user can submit prediction requests directly to PSMP server 109 with no need of network 103.

FIG. 3 is a flowchart illustrating a method to generate a set of predictions associated with manufacture processes of a physical object, according to an embodiment. PSMP server 109 can receive a CAD file or other suitable electronic file with a design of a physical model at 301. In some instances, a CAD file or other suitable electronic file can include data points corresponding to a mesh scheme of the digital model. Thus, PSMP server can extract the mesh scheme data points from the electronic file. In some other instances, when preprocessed data specifying such a mesh scheme is not included in the electronic file, PSMP server 109 can execute one or more processes to generate a mesh scheme of the digital model at 303 as discussed above with reference to mesh analysis engine 211 shown in FIG. 2.

In some instances, a mesh scheme can include data structures containing information related to share vertices in a table of vertices. Such data structure encode simplicial elements as sets of n-tuples, for example, triangles encoded as triples of indices into the table of vertices. A mesh scheme can further include one or more processes for local and global traversal of a mesh including: 1) processes to access individual vertices, edges, and faces; 2) processes to determine a next edge in a face, also known as degree of a face and inverse operation for a previous half-edge; 3) processes to access faces attached to an edge; 4) processes to determine starting and/or ending vertices of an edge; and other suitable processes.

Some specific data structures to implement a mesh scheme include directed-edge, winged-edge, quad-edge, half-edge, and other suitable data structures. These data structures are example data structures that can be used interchangeably to define mesh schemes; thus, they are not intended to suggest any limitation as to the scope of use and/or functionality of the presently disclosed subject matter. Further details regarding examples of half-edge data structures and directed-edge data structures are discussed below.

A half-edge data structure can include a set of half-edge structures. Each half-edge structure contains data values corresponding to a vertex pointed by the half-edge, adjacent faces, pointer to a next half-edge, pointer to an inverse or opposite half-edge, previous half-edge, and other suitable data fields and substructures. In some instances, the implementation of such half-edge structures can be implemented by using pointers, and/or indices stored in arrays for an efficient memory allocation.

A directed-edge data structure can include indices as references to mesh elements e.g., vertices, faces, half-edges, and other suitable elements. Indices of directed-edge structures are defined by a set of rules such that the structures implicitly encode connectivity information of simplicial elements of a mesh. To be more specific, indices corresponding to half-edges of a triangular face can be given by:

$$\text{halfedge}(f, i) = 3f + 1, i = 0, 1, 2 \quad (1)$$

where f is the index corresponding to a triangular face. Then, an index of an adjacent face and its index within that face are given by:

$$\text{face}(h) = h/3 \quad (2)$$

where h is an index of a half-edge.

An instance of a mesh is analyzed at 305 to determine physical and/or geometric attributes of the physical model represented in an electronic file. Example of attributes calculated from a mesh scheme include a data value corresponding to a volume of the physical object, data values corresponding to a surface areas of the physical object, 3-tuple data structures including a length value, a width value, and a height value associated with a prism or bounding box enclosing the digital model, 3-tuple data structures with coordinate data values of a center of the prism, data values corresponding to volume of convex hulls enclosing digital models, data values corresponding to moments of inertia of physical objects, data values corresponding to surface areas of a physical object associated with a computer numerical control machine operation, data values corresponding to non-planar surface areas associated with the physical object, data values corresponding to the number of manufacture tools directions associated with a physical object, data values corresponding to a number of holes associated with a physical object, a data value corresponding to a determination of whether or not a digital model specifies a well-defined shape, and other suitable attributes.

A point cloud scheme is generated at 307 defined by data points in a three-dimensional coordinate system. Such a point cloud scheme is generated for example by point cloud analysis engine 213 discussed with reference to FIG. 2. In general, a point cloud scheme defines a digital model as a collection of 3D coordinates. Point cloud analysis engine 213 can determined attributes of a physical object based on implicit or volumetric properties determined from a point cloud generated from data included in a digital model, or data generated by another engine, for example, mesh analysis engine 211.

In some implementations, a point cloud scheme generated at 307 can classify each 3D point of an embedding space of solid objects of a digital model. Each 3D point can be flagged with a value indicating whether the point lays either inside, outside, or exactly on the surface bounding a solid object. Generation of point cloud scheme can include processes for downsampling, denosing, merging, estimation of normal, and other suitable point cloud processing functionalities.

In some implementations, at 309, one or more 3D shape distributions contained within a point cloud scheme can be determined. A shape distribution can be defined as a unique or signature shape sampled from a shape function. In some implementations, shape distributions can be defined as a function of distance(s) between two random points laying on a surface of a digital model. More specifically, a shape distribution can be defined as a set of histograms of distances between random samples of point cloud points, broken down by Euclidean distance and normal distance, full histograms, interior distances, exterior distances, and any combination of distances thereof.

A point cloud scheme is partitioned into a set of shape distributions at 309. Accordingly, geometric, physical and other suitable properties or attributes can be calculated from functions defining such a set of shape distributions. Advantageously, computational load is minimized by comparing probabilities of distributions, instead of alternative shape matching methods requiring pose registration, feature correspondence, model fitting or other expensive functions. In some instances, dissimilarities between sampled distributions of shape functions are used to discriminate between different physical object represented in a physical model.

At 309, based on the point cloud scheme, an axial symmetry of a convex hull enclosing the digital model, a data value associated with an axial symmetry of a shape defined based on a difference between the convex hull and the digital object and other suitable geometric or physical attributes of the physical object represented in the digital model, are determined.

In some implementations, the mesh scheme generated at 303, mesh analysis performed at 305, the point cloud scheme generated at 307, point cloud analysis performed at 309, and other suitable data structures and processes can be implemented using one or more commercial or public mesh and point cloud processing libraries including, for example, Computational Geometric Algorithms Library™ (CGAL), OpenMesh™, Wolfram Mathematica™, MathWorks Matlab™, and other libraries and/or tools for generating and processing mesh schemes. For example Wolfram Mathematica™ includes libraries to compute discretization of two dimensional and three dimensional graphics to mesh-based regions, compute convex hull of a given set of points, compute a distance to a nearest point in a mesh and other suitable functions for discretization and analysis of mesh schemes. For another example Matlab™ includes a 3D point cloud processing toolbox with functions to read, write, and store point clouds and other point cloud operations and utilities.

In some implementations, a collection of shape distributions can be stored in the storage device 111 shown with reference to FIG. 1 and FIG. 2 or other suitable memory repository. Accordingly, a set of candidate shape distributions can be retrieved on demand, in near real-time as pre-classifiers of shapes in a digital model and can be used as input to predictive engine 217 shown with reference to FIG. 2.

At 311, a set of axioms associated with the manufacture process of a physical object represented in a digital model is determined. PSMP server 109, for example, can rely on machine-learning models implemented in predictive engine 217 discussed above with reference to FIG. 2. In some implementations, machine-learning models can take as input any of the outputs generated by mesh analysis engine 211, point cloud analysis engine 213, symbolic function engine 217, and/or data included in the electronic file with the digital model. Some of the axioms associated with the manufacture of a physical object determined at 311 include, for example, set-up time, cycle time, number of Computer Numerical Control (CNC) operations, whether or not a mill machine is required, whether a lathe machine is required, whether a sheet metal process can be used, what type(s) of blank can be used, what type(s) of fixtures can be used, and/or other suitable axioms associated with the manufacture of a physical object.

Set-up time refers to the time to prepare machine(s) for the manufacture of one instance of a physical object. Cycle time refers to the time it takes to manufacture a physical object not including the set-up time. Cycle time can be measure from "start to start" i.e., the starting point of one product's processing in a specified machine or operation until the start of another similar product's processing in the same machine or process. Cycle time can be specified in categories including: 1) Manual Cycle Time: the time loading, unloading, flipping/turning parts, adding components to parts while still in the same machine/process; 2) Machine Cycle Time: the processing time of the machine working on a part; 3) Auto Cycle Time: the time a machine runs un-aided (automatically) without manual intervention; 4) Overall Cycle Time: the complete time it takes to produce a single unit (this term is generally used when speaking of a single machine or process); 5) Total Cycle Time: this includes all machines, processes, and classes of cycle time through which a product must pass to become a finished product and other suitable categories. Number of Computer Numerical Control (CNC) operations refers to the number of CNC operations of one or more manufacturing machines required in the manufacture a physical object. Type of blank(s) refers to a categorical value indicating cylindrical, rectangular or other suitable type of blanks that can be used in shearing processes for the manufacture of a physical object. Type of fixture(s) refers to a categorical value indicating a type of support device used during the manufacture of a physical object. Fixture types include parallel jaw vice, custom soft jaw vice, custom vacuum fixture, custom bold-down fixture, and other suitable types of fixtures.

At 315, a set of predictions associated with the manufacture process of a physical object is generated. As discussed above, such predictions can be generated by predictive engine 217 with reference to FIG. 2. Such a set of predictions can be derived from any of the outputs generated by mesh analysis engine 211, point cloud analysis engine 215, symbolic function engine 217, any of the axioms determined at 311, data included in the electronic file with the digital model and/or any combination thereof.

Figure 4:
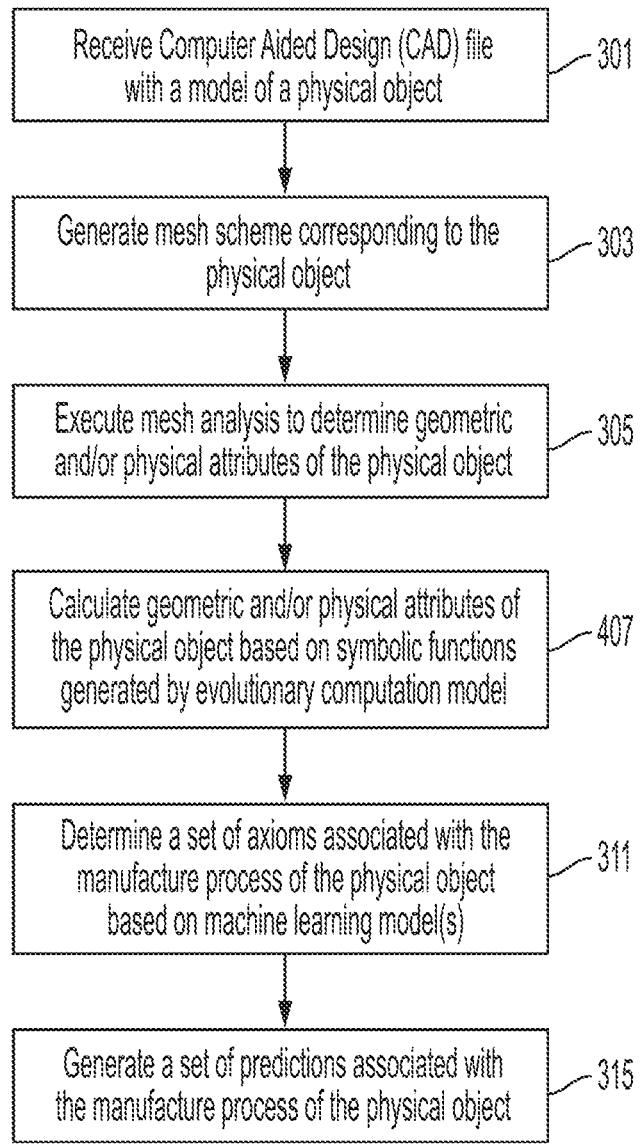
FIG. 4 is a flowchart illustrating a method to generate a set of predictions associated with manufacture processes of a physical object, according to another embodiment.

FIG. 4 is a flowchart illustrating a method to generate a set of predictions associated with manufacture processes of a physical object, according to another embodiment. The method illustrated in FIG. 4 is in some aspects functionally similar to the method discussed with reference to FIG. 3. For example, the operations performed at 301, 303, 305, 311, and 315 discussed with reference to FIG. 3 are executed in the method illustrated in FIG. 4. In FIG. 4 however, PSMP server 109 can calculate geometric and/or physical attributes at 407 from a digital model based on symbolic functions generated by evolutionary computation models in conjunction with symbolic regression.

In this instance, symbolic function engine 215 discussed above with reference to FIG. 2 receives geometric and/or physical attributes corresponding to a physical object generated at 305 and/or mesh scheme generated at 303. Thereafter, a matching process between targeted functions and candidate symbolic functions is executed and a set of expressions in a functional form is determined. PSMP server 109 can determine sample data points, geometrical and/or physical attributes including implicit attributes, volumetric attributes and other suitable physical and geometric attributes from a digital model based on the determined set of expressions. PSMP server 109 then uses the attributes determined at 407 as inputs for machine learning models executed at 311. Further discussion of the application of evolutionary models in conjunction with symbolic regression processes are provided with reference to FIG. 7 and FIG. 8.

Figure 5:
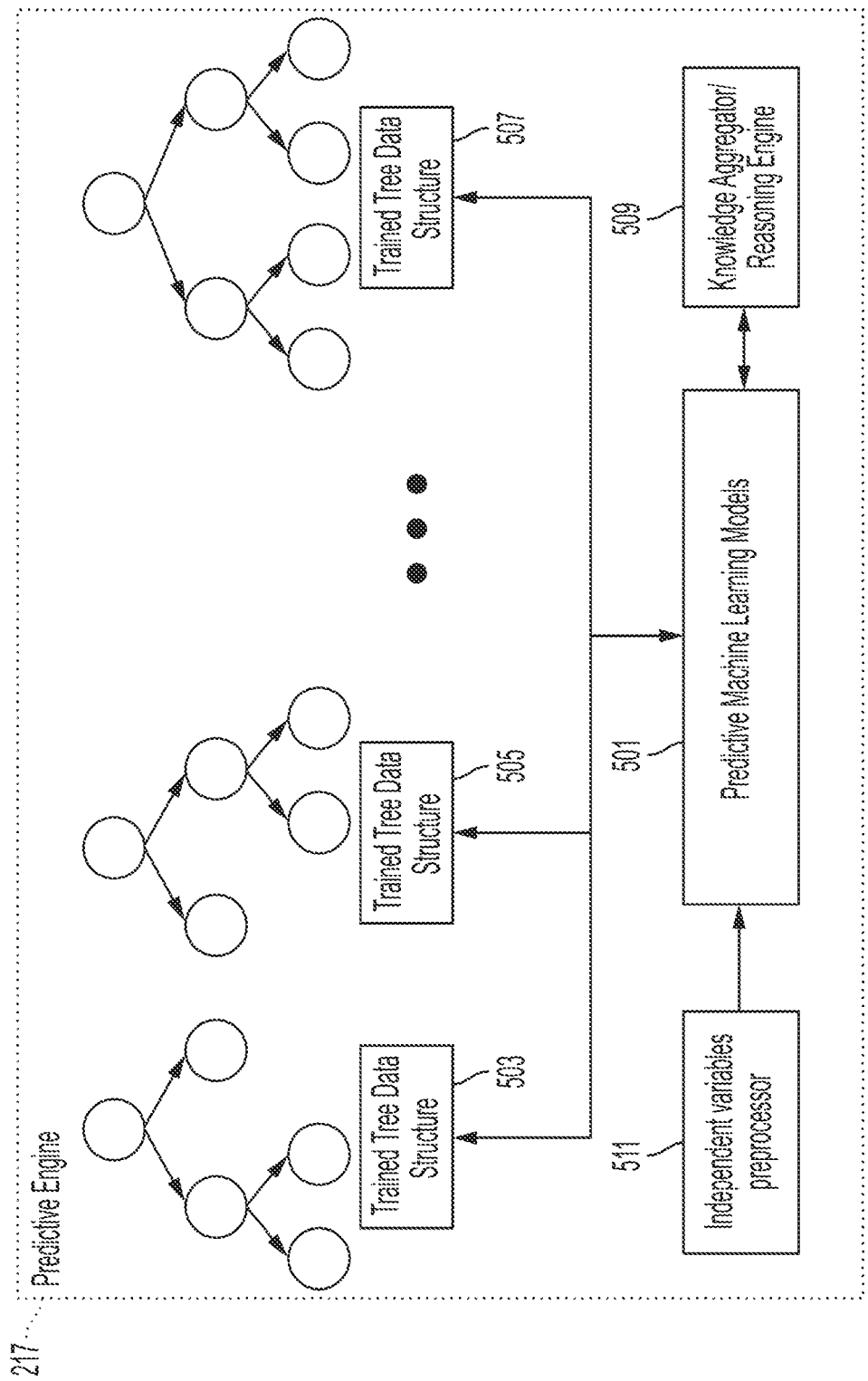
FIG. 5 is a schematic block diagram illustrating components of a predictive engine in a predictive system for manufacture processes, according to an embodiment.

FIG. 5 is a schematic block diagram illustrating components of a predictive engine in a predictive system for manufacture processes, according to an embodiment. Predictive engine 217 includes independent variables preprocessor 511; predictive machine learning models 501; data structures for the application of prediction models, for example, trained tree data structures 503, 505, and 507; and knowledge aggregator and reasoning engine 509.

Independent variables preprocessor 511 performs several operations over datasets generated from mesh analysis engine 211, point cloud analysis engine 213, and/or symbolic function engine 215 (shown in FIG. 2). Independent variable preprocessor 511 determines specific parameters, forms, and/or notations used for the operation of predictive machine learning models 501. Thus, operations performed by independent variables preprocessor 511 include, for example, centering, scaling, parsing, performing imputations over datasets, performing descriptive or inferential statistical analysis over datasets, and/or other suitable operations used to shape datasets to be used as inputs for predictive machine learning models Predictive machine learning models 501 includes a collection of trained machine-learning models to generate a set of axioms associated with the manufacture process of a physical object. Data structures, rules, heuristics, and knowledge bases on which these learning models rely can change over time. Stated differently, machine learning models 501 adapt to new trends and insights identified after their deployment in a production environment. Thus, machine learning models 501 are not limited to the knowledge acquired during their training phase. Some insights from which machine learning models 501 keep learning include new market trends, new types or models of manufacture machines, unseen shapes not included in a training set, new manufacturing shops entering a market, emerging technologies in the manufacture field, and other suitable insights associated with the manufacture of physical objects.

Predictive machine learning models 501 can include, for example, any of least squares regression models, logistic regression models, support vector machines models, stochastic gradient descent models, nearest neighbors classification and/or regression models, Gaussian process classification and/or regression models, neural network classification and/or regression models, ensemble methods models, sequential application models, random forest classifiers models, extremely randomized trees regression models, deep learning models, and/or other suitable machine learning models.

Trained tree data structures 503, 505, and 507 are each an example of data structures used by predictive machine learning models 501. Specifically, in some implementations, trained tree data structures shown in FIG. 5 can be used by classifiers and/or regressors based on, for example, random forest machine learning models, extremely randomized trees machine learning models, logistic regression machine learning models, and/or other suitable machine learning models based on tree data structures.

In some implementations, machine learning models 501 are configured to implement random forest classifiers. Random forest classifiers include a collection of de-correlated decision trees used to classify, for example, types of CNC processes that can be used to manufacture a physical object and other suitable axioms associated with manufacture processes. Some examples of CNC processes that can be determined through random forest classifiers include milling processes, lathe processes, sheet metal processes, and other suitable manufacture processes.

Random forest classifiers can be implemented to determine fabrication technologies or types of machine(s) that can be used to manufacture a physical object, for instance, additive manufacturing machines, subtractive manufacturing machines, casting manufacturing machines, injection molding manufacturing machines, hybrid machines, and other suitable types of manufacturing machines. Examples of additive manufacturing machines include, selective laser sintering machines, manufacturing machines based on Poly-Jet technology, direct metal laser sintering machines, fused deposition modelling machines, binder jetting machines, stereolithographic machines, and other suitable additive manufacturing machines. Examples of subtractive manufacturing machines include CNC milling machines, CNC turning machines, laser cutting machines, waterjet cutting machines, sheet metal punching machines, sheet metal folding machines, wire electrical discharge machining (EDM) machines, and other suitable subtractive manufacturing machines.

Random forest classifiers can be implemented to determine types of fixtures used for the manufacturing of a physical object. For example, a random forest classifier can receive inputs obtained from a mesh of a digital model corresponding to the genus of the physical object, curvature measures of the physical object, aspect ratio of the physical object, or other suitable inputs to determine whether a parallel jaw vice, custom soft jaw vice, custom vacuum fixture, custom bolt down fixture, or other suitable fixture is used for the manufacture of a physical object.

Random forest classifiers rely on N number of de-correlated decision trees. For a given input, each of the N decision trees generates an axiom. In some instances, a final classification axiom is determined by calculating, for example, the mode of the set of axioms generated by the N decision trees, the average or other suitable descriptive statistic. Advantageously, random forest classifiers mitigate a bias-variance tradeoff characteristic of classifiers based on single decision trees. Bias is the error resulting from erroneous assumptions implied in a configuration of a machine learning algorithm. Variance is an error ranging from sensitivity to small fluctuations, which depends on datasets used during the training phase of a machine learning model. Random forest algorithms mitigate the bias-variance tradeoff through a bagging process in which noisy and unbiased models are averaged to generate a model with low variance. A further discussion regarding the implementation of predictive machine learning models based on random forest trees is provided with references to FIG. 9 and FIG. 10.

In some implementations, machine learning models 501 are configured to implement extremely randomized trees regressors and classifiers. Extremely randomized trees are built from a full learning sample in a top-down procedure, starting with the root node and adding, at each step, a new test at one of the terminal nodes of a partially developed tree. Several unpruned trees can be implemented in the extremely randomized trees machine learning model. In some implementations, such trees can be unpruned decision trees and/or regression trees. Nodes in extremely randomized trees are split according to random cut-points. Because of the randomization of cut-points, extremely randomized trees can produce classification and/or decision axioms faster than other standard types of tree structures. Examples of an splitting process for numerical attributes used in extremely randomized trees machine learning model are provided below:

Split a node(S)
Input: local learning subset S corresponding to the node to be split
Output: a split [a<ac] or nothing
  If Stop split(S)=TRUE then, return nothing.
    Otherwise select K attributes $\{a_1, \ldots, a_k\}$ among all non-constant (in S) candidate attributes;
    Draw K splits $\{s_1, \ldots, s_k\}$, where $s_i$=Pick a random split(S, $a_j$), $\forall i=1, \ldots, K$;
    Return a split $s_*$ such that Score($s^*$, S)=Score($s_i$, S).

```
Pick a random split(S,a)
Inputs: a subset S and an attribute a
Output: a split
 - Let $a^s_{max}$ and $a^s_{min}$ denote the maximal and minimal value of a in S;
 - Draw a random cut-point $a^c$ uniformly in $[a^s_{min}, a^s_{max}]$;
 - Return the split [a < ac].
Stop split(S)
Input: a subset S
Output: a boolean
 - If $|S| < n_{min}$, then return TRUE;
 - If all attributes are constant in S, then return TRUE;
 - If the output is constant in S, then return TRUE;
 - Otherwise, return FALSE.
```

Where K is the number of attributes randomly selected at each node and $n_{min}$ is the minimum sample size for splitting a node. The splitting process shown above is executed multiple times over a full learning sample to generate a machine learning model with N number of tree structures. In some instances, when a model based on extremely randomized trees is used to implement a classifier, axioms generated by each of the N trees are aggregated to reach a final axiom. Such a final axiom is determined based on a majority vote elicited from each of the N trees. In other implementations, when a model based on extremely randomized trees is used to implement a regressor, a final axiom can be determined by calculating an arithmetic average of the set of axioms generated by the N trees.

Examples of machine learning models 501 based on extremely randomized trees include regressors to determine axioms associated with the manufacture of a physical object including metrics such as setup time, cycle time, number of CNC operations; these metrics are discussed above with reference to FIG. 3 at 311. A full learning sample used to train extremely randomized trees can be derived from recorded manufacture times and CNC operations of known physical objects. Further details regarding training processes of machine learning models 501 are discussed with reference to FIG. 6.

In some further implementations, machine learning models 501 are configured to implement logistic regression classifiers. Logistic regression models are a type of regression models where the dependent variables are categorical. The model of logistic regression is based on different assumptions (about the relationship between dependent and independent variables) from those of linear regression. The conditional distribution in a logistic regression model is a Bernoulli distribution, because the dependent variable is binary. Second, the predicted values are probabilities and are therefore restricted to (0,1) through the logistic distribution function because logistic regression predicts the probability of particular outcomes. Some of the axioms generated by logistic regression classifiers include what type of blanks can be used in the manufacture process of a physical object, and other suitable axioms expressed as true or false associated with the manufacture of a physical object. For example, given an axial symmetry of a convex hull enclosing a digital model (i.e., hull symmetry) a logistic regression model can determine a categorical value corresponding to a blank type that can be used to manufacture a physical object. In some instances, CNC processes including milling processes, lathe processes, sheet metal processes, and other suitable manufacture processes, can be determined through logistic regression models.

The axioms generated by the machine learning models 501 can be specific to one or more of an additive manufacturing machine, subtractive manufacturing machine, casting manufacturing machine, injection molding manufacturing machine, hybrid manufacturing machine and other suitable fabrication technologies.

The axioms generated by the machine learning models 501 can be specific or tailored to numerous fabrication materials including metals, plastics, and other suitable fabrication materials. Examples of metals include aluminum alloys, stainless steel alloys, steel alloys, brass/bronze alloys, copper alloys, nickel alloys, titanium alloys, magnesium and other suitable metals and alloys. Examples of plastics include, acrylonitrile styrene acrylate, acrylonitrile butadiene styrene, polycarbonate, Ultem™, Delrin®, Nylon, and other synthetic polymers and plastics.

Knowledge aggregator/reasoning engine 509 receives as input one or more axioms generated by predictive machine learning models 501, and generates predictions associated with the manufacture of a physical object. In some instances, predictions can be based on the axioms generated by two or more machine learning models by combining the axioms using an average function, median, or other suitable type of descriptive statistical function. In other instances, axioms generated by different learning models can be evaluated through a function, such that an axiom or a set of axioms showing lower error levels and/or highest confidence values are selected from a set of candidate axioms. In other further instances, one or more axioms generated by machine learning models 501 can serve as input to a reasoning engine. Rules in the reasoning engine can be expressed in data structures denoting symbolic logic propositions, terms, and/or relations to support the reasoning of predictive engine 217. In yet some further instances, predictions can be generated through sets of linear and non-linear functions. For example, a predicted cost associated with the manufacture of a physical object can be calculated by engine 509 as a function of axioms indicating a number of CNC operations used to manufacture an object, setup time, and cycle time multiplied by machine rate (including fixed costs, operating costs and/or labor costs) and further multiplied by a quantity of objects requested to be manufactured.

Knowledge aggregator/reasoning engine 509 can determine mechanical properties of a physical object specified in a digital model that depend on fabrication materials. Some mechanical properties dependent on fabrication materials determined at engine 509 include mechanical properties associated with uniaxial mechanical responses, thermodynamics mechanical responses, stress and strain mechanical responses, yield and plastic flow mechanical responses, fracture mechanical responses, and other suitable types of mechanical responses associated with a physical object to be built in a determined fabrication material. More specific examples of such mechanical properties include elastic modulus; tensile strength; tensile elongation; shear modulus; shear strength; flexural strength; flexural modulus; compression strength; compression modulus; fracture toughness; Rockwell hardness (HR) including HRA for tungsten carbides, HRB for aluminum, brass and soft steels, and HRC for hard steels (greater than HRB 100); coefficients of thermal expansion; and other suitable properties dependent on fabrication materials. Mechanical responses can be simulated with libraries from custom-made simulation software, open source software solutions, and/or commercial software such as AudoDesk® AutoCAD®, SolidWorks® or other suitable software.

In some implementations, knowledge aggregator/reasoning engine 509 can predict whether is feasible or not to manufacture a physical object using a specific fabrication material. In some instances, when is feasible to manufacture a physical object on more than one fabrication material, engine 509 can execute a multi-objective optimization based on user specified requirements to suggest one or more fabrication materials and/or fabrication technologies. The suggested fabrication materials can be expressed, for example, as an Edgeworth-Pareto solution based on user requirements and mechanical response properties of the physical object dependent on fabrication materials.

Figure 6:
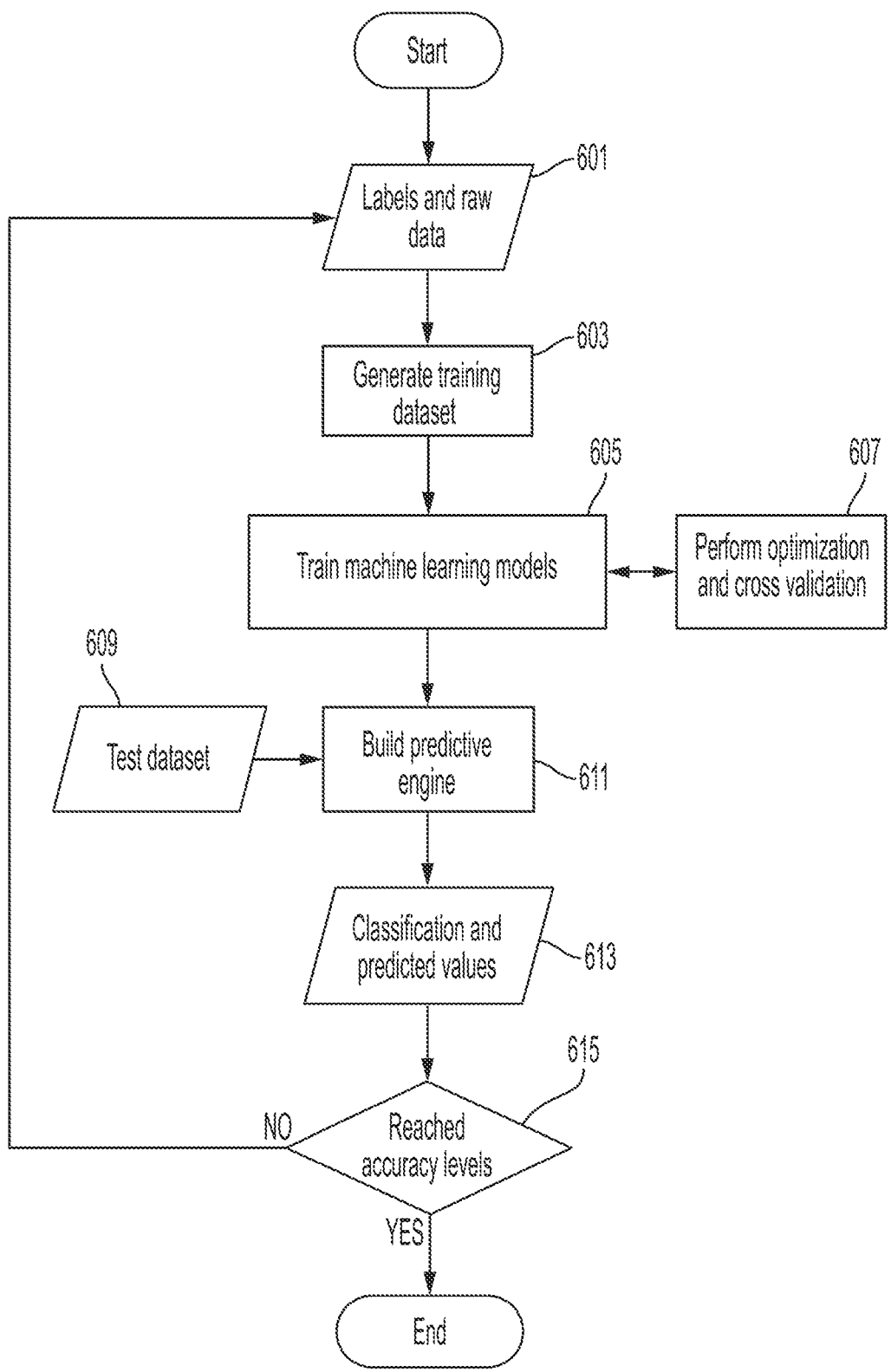
FIG. 6 is a flowchart illustrating a method to train machine learning models of a predictive system for manufacture processes, according to an embodiment.

FIG. 6 is a flowchart illustrating a training phase method for machine learning models of a predictive system for manufacture processes, according to an embodiment. PSMP server 109 (shown in FIG. 1) can implement supervised, unsupervised, and/or reinforcement based machine learning models. The method illustrated in FIG. 6 is an example of supervised learning method; variations of the exemplary training method discussed below, however, can be implemented to train unsupervised and/or reinforcement machine learning models. Although the method of FIG. 6 is discussed with respect to PSMP server 109, the method can be used with other systems.

PSMP server 109 receives, at 601, a corpus of raw datasets. Each dataset in the corpus includes a labeled shape associated with an array data structure: the shapes can be 2D shapes, 3D shapes or any other shape defined in other suitable dimension space. The array data structure stores a set of data values corresponding to geometric and/or physical attributes of such a shape.

PSMP server 109 generates, at 603, a training set by executing one or more operations over the corpus received at 601. The operations, executed at 603, include the selection of a minimum set of shape attributes that can be used by, for example, a classifier to differentiate among different shapes. In some instances, such a minimum set of shape attributes can be determined by eliminating shape attributes that are highly correlated and thus, redundant. Accordingly, a dimensionality reduction process can be applied to compress the attributes onto a lower dimensionality subspace and advantageously, storage space can be minimized, resulting in the improvement or optimization of computation load used by the method. In some further instances, the attributes associated with a shape are scaled, for example, each selected attribute is expressed as a value ranging from [0 ... 1] and/or a standard normal distribution with zero mean and unit variance.

In some implementations, one or more machine learning models are trained at 605. The machine learning models trained at 605 are selected based on different criteria depending on the problem to be solved and/or data available in the training set. For example, machine learning classifiers can suffer from different degrees of bias. Accordingly, more than one machine learning model can be trained at 605, optimized and cross-validated at 607. Thus, a subset of the trained machine learning models can be selected to build predictive engine 611 according to, for example, classification accuracy, defined as the proportion of correctly classified instances.

In some instances, machine learning models built at 611, are further evaluated using an unseen test dataset 609. Thus, the predictive engine built at 611 generates classification values and/or predicted values at 613. Classification and/or prediction values are evaluated at 615 to determine whether such values have achieved a desired accuracy level. When such a desired accuracy level is reached, the training phase ends; when the desired accuracy level is not reached, however, then a subsequent iteration of the process shown in FIG. 6 is performed starting at 601 with variations such as, for example, considering a larger collection of raw data.

Figure 7:
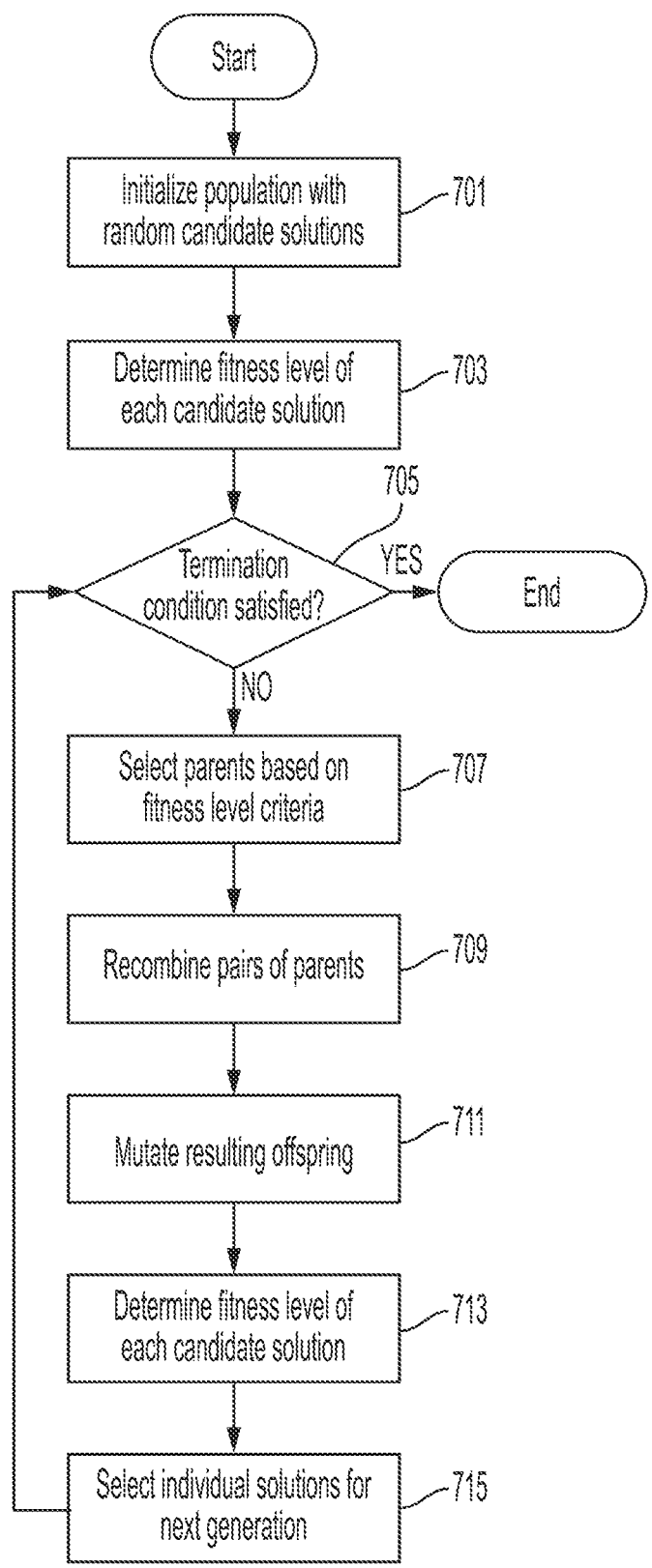
FIG. 7 is a flowchart illustrating an example of a method to implement an evolutionary model of a predictive system for manufacture processes, according to an embodiment.

FIG. 7 is a flowchart illustrating an example of a method to implement an evolutionary model of a predictive system for manufacture processes, according to an embodiment. In some implementations, one or more evolutionary algorithms can be used to determine symbolic functions to calculate geometric and/or physical parameters associated with a physical object. In general, evolutionary models work under a principle that specifies that given an initial population of individuals (samples), a rise in the fitness of such a population is experienced over time due to natural selection. When a domain of candidate solutions is represented as an initial population, an optimal solution(s) can be determined over time through the execution of evolutionary models.

Several types of evolutionary models can be implemented in PSMP server 109 including models based on genetic algorithms (GA), models based on evolution strategy (ES) algorithms, models based on evolutionary programming (EP), models based on genetic programming (GP), and other suitable evolutionary algorithms. Accordingly, different data structures can be used to implement such algorithms including strings over a finite alphabet, real-valued vectors, finite state machines, tree structures and other suitable data structures.

In some implementations, PSMP server 109 initializes, at 701, a population by generating a random sample of candidate solutions. For example, candidate solutions can be provided as set of random shape distributions determined as a function of distance(s) between two random points laying on a surface of a digital model. As discussed with reference to FIG. 3, shape distributions can be defined as a function of distance(s) between two random points laying on a surface of a digital model. Each of the candidate solutions is evaluated at 703 based on a fitness function. Such a fitness function is used to assign a quality measure to a candidate solution.

A termination condition is then evaluated at 705. A termination condition can based on any of: 1) a known optimal fitness level, 2) a time based condition, 3) a total number of executed fitness evaluations, 4) a threshold representing fitness improvement shown by a number of generations, 5) a measure of how much population diversity drops over a number of generations, and/or any combination of these conditions and other suitable conditions to prevent the process of FIG. 6 from iterating an infinite number of times while providing an optimized set of solutions upon the last executed iteration.

In some instances, when the termination condition at 705 is met, then the process stops. In other instances, when the termination condition at 705 is not met, then a set of candidate solutions is selected as parents based on fitness and/or quality criteria. Selected candidate solutions are used as parents to generate a next generation of candidate solutions. For example, pairs of candidate solutions selected at 707 are recombined at 709 to generate offspring candidate solutions.

A stochastic mutation operator is applied at 711 to offspring candidate solutions. In some instances, such a mutation operator causes a random, unbiased change over an offspring. Thereafter, the fitness level of each candidate solution of a new generation is determined at 713. In some implementations, the fittest individuals or candidate solutions are selected for the next generation at 715, i.e., a next iteration of the loop shown in FIG. 7 until termination condition 705 is satisfied.

Figure 8:
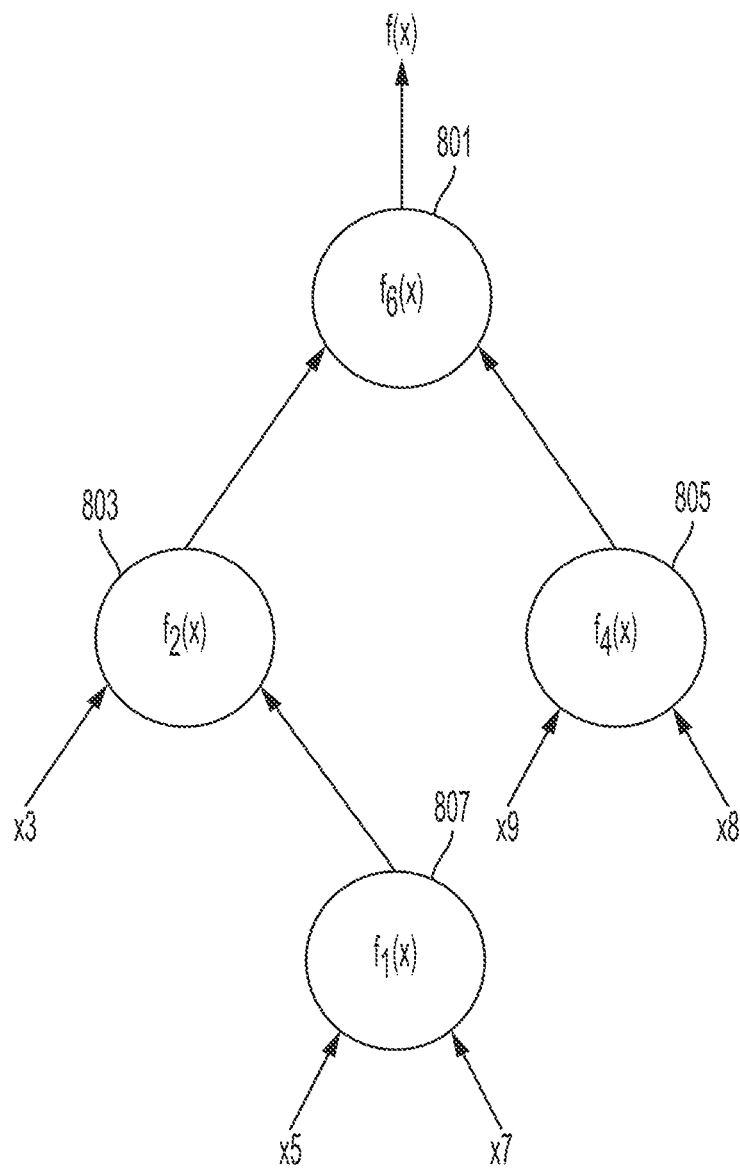
FIG. 8 is a data structure for symbolic regression built via an evolutionary model of a predictive system for manufacture processes, according to an embodiment.

FIG. 8 is a data structure for symbolic regression built via an evolutionary model of a predictive system for manufacture processes, according to an embodiment. A specific application of evolutionary process discussed with reference to FIG. 7 in conjunction with symbolic regression is described below. In some implementations, evolutionary models are used to infer function approximations represented in tree structures as the example shown in FIG. 8. The advantage of such models over other function learners is that they automatically discover an underlying structure of a function.

The objective of polynomial function approximation is to infer a polynomial p(x) that is capable of mapping reliably not only the data provided in a training set, but also on average unseen data, which is generated by sources similar to the sources used to obtained a training set. The approximation problem can be expressed as follow: given instantiated vectors of independent variables $xi=(x_{i1}, x_{i2}, \ldots x_{id}) \in R^d$ and dependent variable values $y_i = \in R$, find models p(x) optimally close to their unknown source function f(x)=y.

High-order multivariate polynomials are a universal format for function modeling with which any continuous mapping may be approximated up to an arbitrary precision, in average squared residual sense, if there are a sufficiently large number of terms. Such polynomials are defined by the power series:

$$p(x) = a_0 + \Sigma_{m=1}^{M} a_m \Pi_{j=1}^{d} x_{jm}^{r} \quad (3)$$

where $a_m$ are the term coefficients, m ranges up to a pre-selected maximum number of terms M: m≤M; $x_j$ are the independent variable values of the input vector x, j≤d numbers; and $r_{jm}$ is bound by a maximum polynomial order (degree) s: $\Sigma_j^d r_{jm} \leq s$ for every m.

Polynomials (3) are combinations of terms that are linear in the coefficients, and non-linear in the variables. Cross-product and power terms are derived from standard basis $\emptyset = (1, x_1, x_2 \ldots, x_d, x_1^2, x_1 x_2, x_1 x_3, \ldots, x_1^3, x_1^2 x_2, x_1^2 x_3 \ldots)$. Using this basis $\emptyset$, a high-order multivariate polynomial can be defined with the equation:

$$p(x) = \Sigma_{m=0}^{M} a_m \emptyset_m(x) \quad (4)$$

where $a_m$ are the coefficients, and $\emptyset_m$ are the basis functions from $\emptyset$. Basis functions of $h_m$ are used to emphasize that only a small subset of $\emptyset$ is considered.

In some instances an overall polynomial can be defined as a hierarchical composition of simple transfer polynomials whose coefficients are calculated by least square methods. These simple transfer polynomials are primitive functions that once composed hierarchically do not rapidly increase the overall polynomial degree. In FIG. 8, simple transfer polynomials are represented in the nodes 801, 803, 805, and 807. Overall polynomials (e.g., f(x) at the top of FIG. 8) are used to determine different geometric and physical attributes of a physical object. Independent variables, x3, x5, x7, x9, and x8 can correspond to data values associated with a physical object generated by, for example, mesh analysis engine 211, point cloud analysis engine 213 and/or retrieved directly from data included in a digital model. Examples of such independent variables include data values corresponding to a surface areas of the physical object, 3-tuple data structures including a length value, a width value, and a height value associated with a prism enclosing the digital model (i.e., bounding box), 3-tuple data structures with coordinate data values of a center of the prism, data values corresponding to volume of convex hulls enclosing digital models, data values corresponding to moments of inertia of physical objects, data values corresponding to surface areas of a physical object associated with a computer numerical control machine operation, data values corresponding to a number of holes associated with a physical object, and/or other suitable attributes.

Polynomials can be represented as tree structures. Each tree contains nodes with complete bivariate second degree transfer polynomials such as $p(x) = a_0 + a_1 x_1 + a_2 x_2 + a_3 x_1 x_2 + a_4 x_1^2 + a_5 x_2^2$. Independent variables are represented as terminal leaves in the example illustrated in FIG. 8.

A polynomial can be built form a tree structure using a vertical technique. Having a finite number N of data $D = \{(x_i, y_i)\}_{i=1}^{N}$ from independent variable vectors $x_i$ and their corresponding outcomes $y_i$, mean square error methods can be used for finding polynomial coefficients $a_m$. Coefficients of the transfer polynomials at each node are computed by, for example, the execution of ordinary least square (OLS) fitting equation provided below:

$$a = (H^T H)^{-1} H^T y \quad (5)$$

where a is (m+1)×1 column vector, H is N×(m+1) design matrix of row vectors $h(x_i) = (h_0(x_i), h_1(x_i), \ldots, h_m(x_i))$, m≤M, i=1 ... N, y is the N×1 output column vector, and Ha=p.

An evolutionary model as described with reference to FIG. 7 can be used to define polynomials for the determination of different attributes of a physical object. For example, an initial population of trees can be generated through a ramped half-and-half method. The best trees can be probabilistically selected as parents of a new generation. Crossover can be applied by selecting a random node from each parent tree as the crossover point to generate two new offspring for the next generation. Mutation can be performed by selecting a node as the mutation point and a new node or subtree is generated originating at the mutation point and replacing the branch that was derived originally from the selected mutation point.

In some implementation, a collection of tree structures as the one shown in FIG. 8 are executed by symbolic regression engine 217 discussed with reference to FIG. 2. Accordingly, polynomial terms, cross terms, transcendental functions and other suitable expressions and values can be calculated by symbolic regression engine 217.

Figure 9:
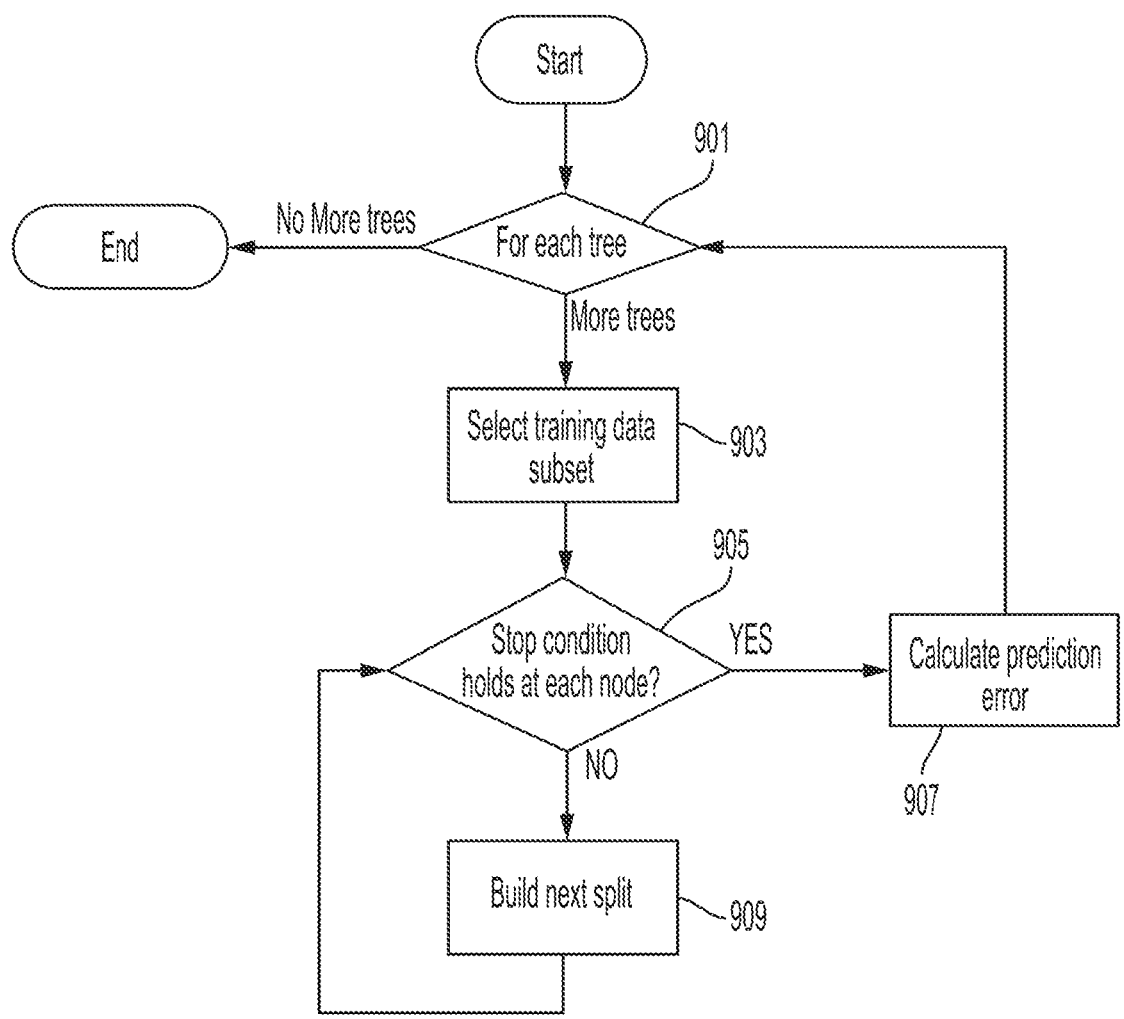
FIG. 9 is a flowchart illustrating a method to build a random forest classifier machine learning model, according to an embodiment.

FIG. 9 is a flowchart illustrating a method to build a random forest classifier machine learning model, according to an embodiment. Given training dataset TS with a shape identifier (SID) and a collection of physical and/or geometric attributes below {A1, A2, A3 . . . An}, TS can be expressed as follows:

$$TS = \begin{bmatrix} A1 & A2 & A3 & \ldots & SID1 \\ A1 & A2 & A3 & \ldots & SID2 \\ A1 & A2 & A3 & \ldots & SID3 \end{bmatrix} \quad (6)$$

A collection of trees are generated from the training set TS. For each tree, a different subset of random attributes is taken into account to define a random training set. For example $TS_1$ and $TS_2$ can be defined as below:

$$TS_1 = \begin{bmatrix} A1 & A2 & A3\ldots & SID1 \\ A16 & A4 & A91\ldots & SID2 \\ A7 & A22 & A53\ldots & SID3 \end{bmatrix}$$

$$TS_2 = \begin{bmatrix} A63 & A54 & A48\ldots & SID1 \\ A9 & A12 & A79\ldots & SID2 \\ A68 & A12 & A31\ldots & SID3 \end{bmatrix}$$

A decision tree is generated for each of the defined random training sets. The collection of decision trees is known as the random forest. Differently stated, a random forest is a classifier including a collection of tree-structured classifiers {h(x, Θk), k=1, . . . } where the {Θk} are independent identically distributed random vectors and each decision tree casts a unit vote for the most popular class at input x. In other words, building a random forest comprises the task of generating random vectors to grow an ensemble of decision trees and letting those decision trees vote for the most popular class. In some implementations a final prediction can be based on the average of predictions from the entire forest or a majority of vote classification.

An example of a process to implement a random forest classifier is provided below. Assume a number of decision trees to grow is t, then for each decision tree (at 901) select a training data subset n as shown at 903 from the training set TS (e.g., bagged subset of samples or bootstrap sample). The conditional statement at 905 determines whether a stop condition holds at each node of a growing decision tree. The stopping condition depends on the selected training data subset n. Some examples of the condition evaluated at 905 include the number of training samples at the node, if a maximum depth is reached or other suitable conditions.

If such condition is satisfied, the current node becomes a leaf node and a prediction error for the decision tree is calculated at 907. If the stop condition at 905 does not hold, an internal node is grown and a split function is selected from a pool of random functions such that training errors from n are minimized. The selected split function induces a partition of the subset n into two sets, which in turn become the left and right children nodes of the current node where the training procedure is continued. Further details regarding an example implementation of a splitting function are discussed with reference to FIG. 10.

Figure 10:
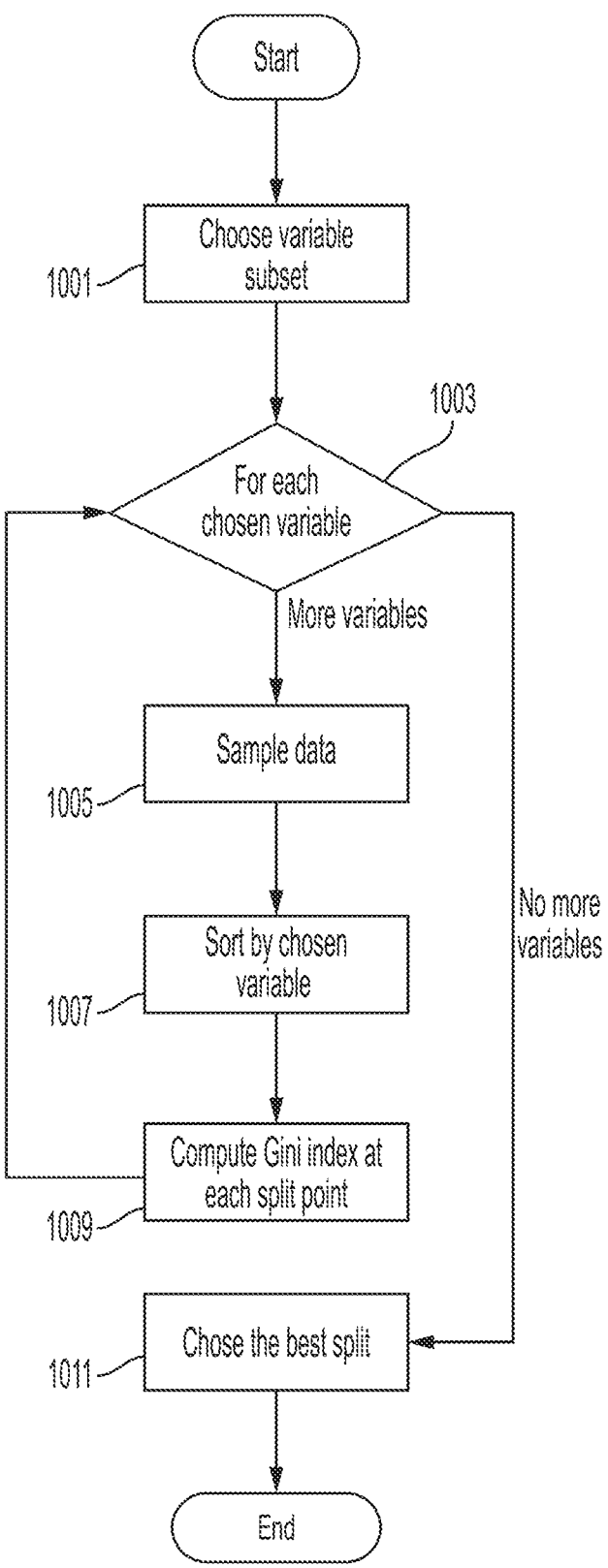
FIG. 10 is a flowchart illustrating a method for applying a splitting criterion to a random forest classifier machine learning model, according to an embodiment.

FIG. 10 is a flowchart illustrating a method for applying a splitting criterion to a random forest classifier machine-learning model, according to an embodiment. In some implementations, an impurity-based Gini index is used as an attribute selection measure to assess splitting criterion. Accordingly, for a node, a subset of variables is randomly selected at 1001. An iterative loop starts at 1003 in which for each of the sampled data 1005 is sorted by the chosen variable at 1007. Thereafter, at 1009, the Gini index or other suitable function is computed at each split point. The Gini index measures the impurity of a dataset. The Gini index considers a binary split for each attribute. Gini index point of a set is defined as follows:

$$\text{Gini}(S) = 1 - \Sigma_{i=0}^{m} p_i^2$$

where $p_i$ is the proportion of observations or samples with a target variable (e.g., SID) and m is the number of different values taken by the target variable.

Figure 11:
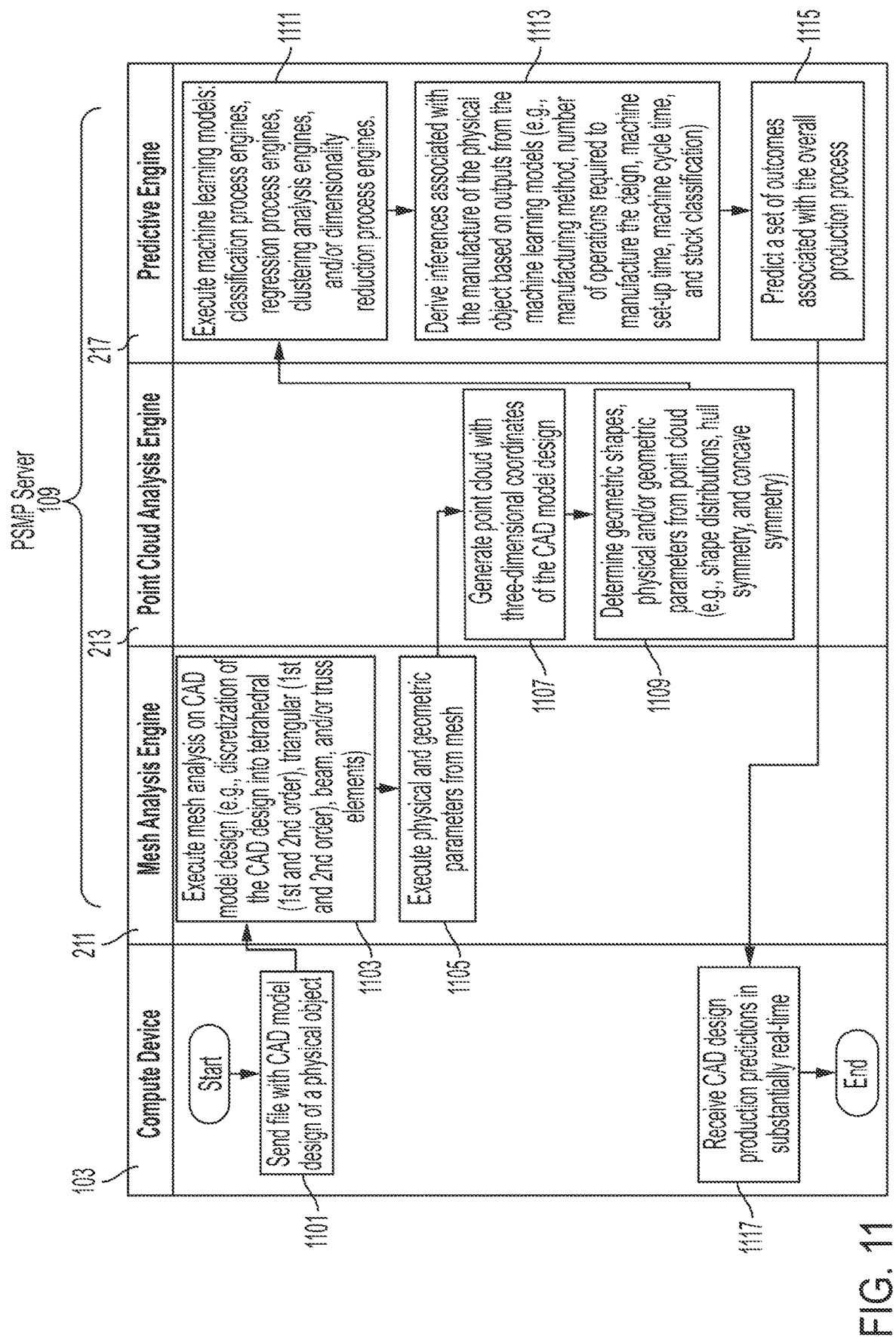
FIG. 11 is a cross-entity flowchart illustrating a method to compute predictions in a predictive system for manufacture processes, according to an embodiment.

FIG. 11 is a cross-entity flowchart illustrating a method to compute predictions in a predictive system for manufacture processes, according to an embodiment. In some implementations, compute device 103 sends an electronic file with a digital design model (e.g., CAD) of a physical object at 1101 to PSMP server 109. In some implementations, mesh analysis engine 211 receives the electronic file and executes a mesh analysis on the CAD model. In some instances, the analysis executed by mesh analysis engine 211 includes a discretization (at 1103) of a CAD design into, for example, tetrahedral, triangular, beam and/or truss elements. Thereafter, mesh analysis engine 211 can extract and/or calculate at 1105 physical and/or geometric parameters from the generated mesh. Specific examples of physical and/or geometric parameters calculated by mesh analysis engine 211 were discussed above with reference to step 305 in the process shown in FIG. 3.

In some implementations, point cloud analysis engine 213 generates a point cloud model at 1107 including a collection of 3D coordinates derived from the CAD model design. Such a point cloud model is used at 1109 by point cloud analysis engine 213 to determine geometric shapes, physical and/or geometric parameters. Specific examples of physical and/or geometric parameters calculated by point cloud analysis engine 213 were discussed above with reference to step 309 in the process shown in FIG. 3. Further examples of such parameters include variables based on distance between surfaces. For instance, the proportion of a surface that bounds a solid region of a digital model with a thickness under a given cutoff and/or the proportion of a surface that bounds a void region with a thickness under a given cutoff.

Physical and/or geometric parameters calculated by mesh analysis engine 211 and point cloud analysis engine 213 are sent to predictive engine 217. In some implementations, predictive engine 217 executes at 1111 one or more machine learning models to generate axioms associated with properties of a physical object represented in the CAD model discussed at 1101. Some examples of the predictive machines learning models used by predictive engine 217 include regression process engines, clustering analysis engines, dimensionality reduction process engines, and other suitable machine learning models discussed above with reference to predictive machine learning models 501 in FIG. 5.

In some implementations, predictive engine 217 derives inferences, at 1113, based on axioms generated by machine learning models at 1111. Such inferences include manufacturing methods, number of operations used to manufacture a design, machine setup time, machine cycle time, stock classification and other suitable axioms associated with the manufacture of a physical object. Thereafter, predictive engine 217 generates a set of predictions associated with the overall production process of a physical object corresponding to the model design discussed at 1101. Such a set of CAD design production predictions is sent to compute device 103 in near real-time at 1117. An example of manufacture predictions displayed on a GUI is discussed below with reference to FIG. 13.

Figure 12:
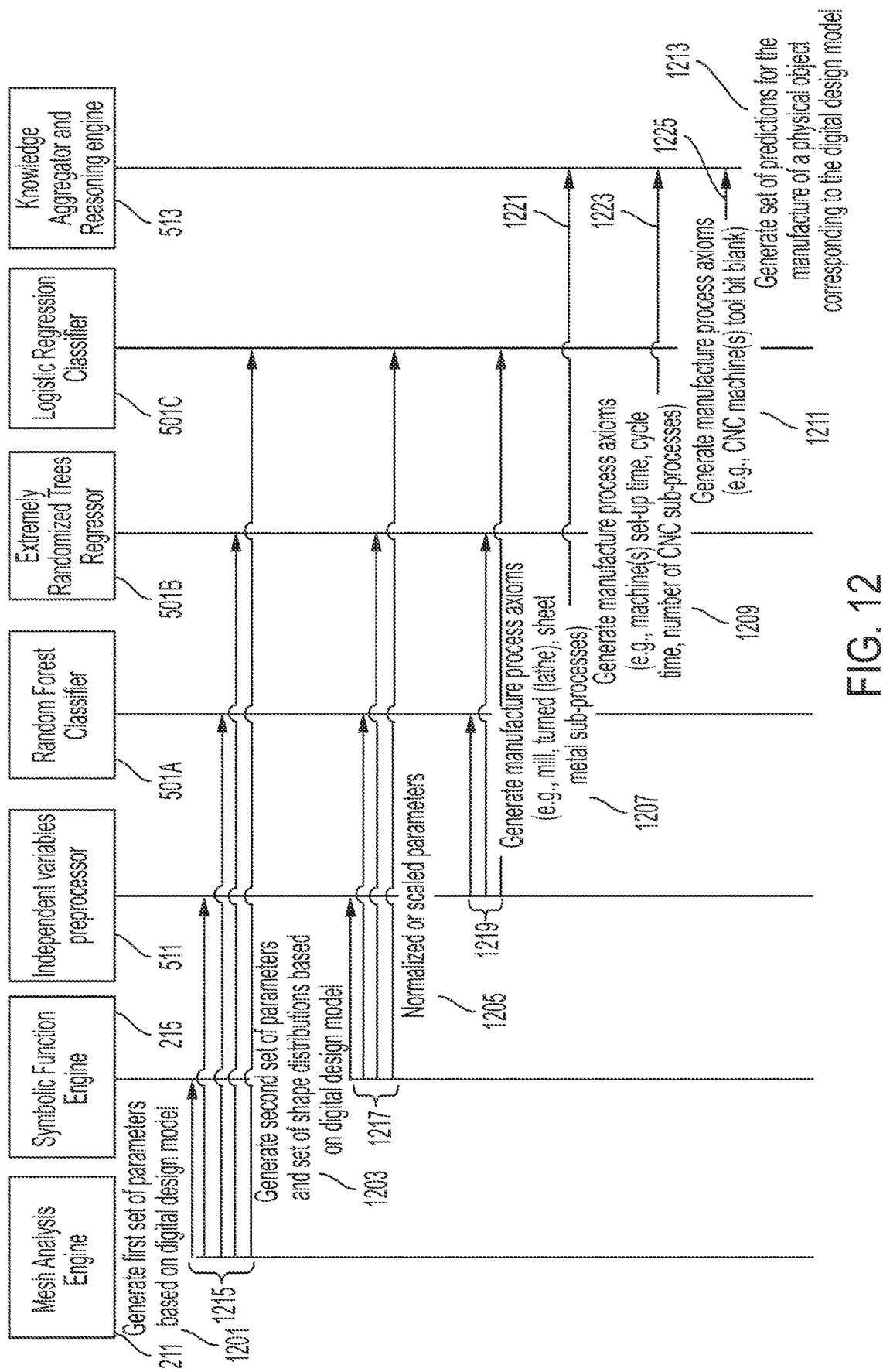
FIG. 12 is an example of a signal flow illustrating a method to compute predictions associated with manufacture of physical objects based on knowledge acquisition from a random forest classifier, an extremely randomized trees regressor, and a logistic regression classifier, according to an embodiment.

FIG. 12 is an example of a signal flow illustrating a method to compute predictions associated with manufacture of physical objects based on knowledge acquisition from a random forest classifier, an extremely randomized trees regressor, and a logistic regression classifier, according to an embodiment. Aspects of mesh analysis engine 211 and symbolic function engine 215 are discussed above with reference to FIG. 2. Aspects of independent variables preprocessor 511 are discussed above with reference to FIG. 5. Random forest classifier 501B, extremely randomized trees regressor 501B, and logistic regression classifier 501C are examples of predictive machine learning models 501 also discussed above with reference to FIG. 5.

In some implementations, mesh analysis engine 211 computes one or more operations over a discretized version of a digital model to generate, at 1201, a set of physical and/or geometric parameters or attributes. In some instances, the set of parameters generated by mesh engine 211 are propagated, at 1215, to one or more of the symbolic function engine 215, independent variables preprocessor 511, random forest classifier 501A, extremely randomized trees regressor 501B, and logistic regressor classifier 501C. Examples of the physical and/or geometric parameters or attributed generated by mesh analysis engine 211 include first set of parameters includes any of a data value corresponding to a volume of the physical object, a data value corresponding to a surface area of the physical object, a 3-tuple data structure including a length value, a width value, and a height value associated with a prism enclosing the digital model, a 3-tuple data structure with coordinate data values of a center of the prism, a data value corresponding to a volume of a convex hull enclosing the digital model, a data value corresponding to a moment of inertia of the physical object, a data value corresponding to a surface area of the physical object associated with a computer numerical control machine operation, a data value corresponding to a non-planar surface area associated with the physical object, a data value corresponding to a number of manufacture tool directions associated with physical object, and/or a data value corresponding to a number of holes associated with the physical object.

Symbolic function engine 215 receives as inputs parameters generated by mesh engine 211. Symbolic function engine 215 executes one or more process according to symbolic functions determined by evolutionary algorithms models discussed with reference to FIG. 7 and FIG. 8. Accordingly, further physical and/or geometric parameters are generated, at 1203. For example, symbolic function engine 215 can determine implicit or volumetric parameters associated with a digital model. Parameters generated by symbolic function engine 215 are propagated at 1217 to one or more of independent variable preprocessor 511, random forest classifier 501A, extremely randomized trees regressor 501B, and logistic regressor classifier 501C.

Independent variables preprocessor 511 receives parameters or attributes from mesh analysis engine 211 and/or symbolic function engine 215. Thereafter, independent variables preprocessor 511 perform one or more operations, at 1205, over the received parameters so they can be used as inputs by random forest classifiers 501A, extremely randomized trees regressor 501B, and logistic regression classifier 501C. Some exemplary operations performed by independent variables preprocessor include scaling, for example, each received attribute or parameter to a value ranging from [0 . . . 1], a standard normal distribution with zero mean and unit variance, and other suitable forms. Such normalized or scaled versions of the parameters are then propagated, at 1219, to random forest classifier 501A, extremely randomized trees regressor 501B and logistic regression classifier 501C.

Random forest classifier 501A receives in some instances parameters or attributes generated from mesh analysis engine 211, symbolic function engine 215 and/or independent variables preprocessor 511. Aspects of random forest classifier are discussed with reference to FIG. 9 and FIG. 10. Some of the axioms associated with the manufacture of a physical object determined at 1207 include whether or not a mill machine is to be used, whether a lathe machine is to be used, whether a sheet metal process can be used and other suitable axioms associated with the manufacture of a physical object.

Extremely randomized trees regressor 501B receives in some instances, parameters or attributes generated from mesh analysis engine 211, symbolic function engine 215 and/or independent variables preprocessor 511. Aspects of random forest classifier are discussed with reference to FIG. 5. Some of the axioms associated with the manufacture of a physical object determined at 1207 include setup, time cycle, number of Computer Numerical Control (CNC) operations, and/or other suitable axioms associated with the manufacture of a physical object.

Logistic regression classifier 511 receives, in some instances, parameters or attributes generated from any of mesh analysis engine 211, symbolic function engine 215 and/or independent variables preprocessor 511. Aspects of logistic regression classifier 511 are discussed with reference to FIG. 5. Some of the axioms associated with the manufacture of a physical object determined at 1211 include what type(s) of blank can be used, and other suitable axioms associated with the manufacture of a physical object.

Knowledge aggregator and reasoning engine 513 receives, in some instances, axioms generated by random forest classifier 501A, extremely randomized trees regressor 501B, logistic regression classifier 501C and/or other suitable machine learning models. Aspects of knowledge aggregator and reasoning are discussed with reference to FIG. 5. Knowledge aggregator and reasoning engine generates at 1213 a set of predictions for the manufacture of a physical object corresponding to the digital design model. Such predictions can be sent to a compute device of a user requesting an assessment associated with the manufacture of a physical object.

Figure 13:
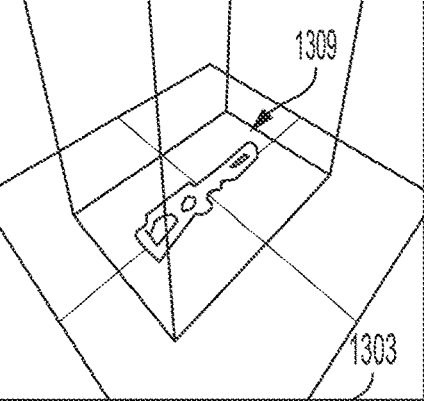
FIG. 13 is an example of an output from a graphical user interface of the predictive system for manufacture processes and related to predicted outcomes associated with the manufacture of a physical object, according to an embodiment.

FIG. 13 is an example of an output from a graphical user interface of the predictive system for manufacture processes and related to predicted outcomes associated with the manufacture of a physical object, according to an embodiment. Graphical user interface 113 corresponds to the graphical user interface shown in FIG. 1. The graphical user interface 113 displays predictions generated by the PSMP server 109. Predictions include a total cost 1301 to manufacture on or more physical object. A button 1303 to allow a user to select among different materials that can be used to manufacture a physical object. Estimated time to receive a prototype in a variety of production grade thermoplastics, and its associated costs shown at 1305. A dropdown menu with available prototyping technologies 1307 that can be used to manufacture a physical object specified in a digital model 1309, in this case, fuse deposition modeling.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, Python, Fortran, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

What is claimed is:

1. A non-transitory memory device including instructions stored thereon for directing one or more computer processors to provide a graphical interface tool for providing predictions of manufacturing processes, the instructions comprising steps for:
    receiving by the graphical interface tool an electronic file including a digital model representative of a physical object to be manufactured;
    receiving by the graphical interface tool at least one manufacturing parameter taken from a group consisting of: an identification of a manufacturing machine, an identification of a fabrication material, or an identification of a manufacturing process; and
    returning by the graphical interface tool, in near real-time or faster, responsive information associated with manufacturing the physical object, the responsive information including information related at least to a predictive value generated by a predictive engine;
    wherein the predictive value generated by the predictive engine is generated by the predictive engine based at least in part upon (a) at least one of a set of parameters associated with the digital model or information derived from the set of parameters, and (b) one or more neural network machine learning models, at least one of the one or more neural network machine learning models trained using a collection of digital models of a domain of mechanical objects;
    wherein the at least one predictive value corresponds to one or more of the following: predicted cost, set-up time, cycle time, a number of Computer Numerical Control (CNC) operations, requirement of a mill machine, requirement of a lathe machine, requirement of a sheet metal process, a type of blank used, or a type of fixture used; and
    wherein at least one of the one or more neural network machine learning models is selected from an available set of a plurality of neural network machine learning models based upon the received manufacturing parameter.

2. A non-transitory memory device including instructions stored thereon for directing one or more computer processors to provide a graphical interface tool for providing predictions of manufacturing processes, the instructions comprising steps for:
    receiving by the graphical user interface tool an electronic file including a digital model representative of a physical object to be manufactured;
    receiving by the graphical interface tool an identification of a fabrication parameter; and
    returning by the graphical user interface tool responsive information associated with manufacturing the physical object, the responsive information including information related at least to a predictive outcome generated by a predictive engine, and the responsive information including a manufacturing feasibility outcome for the physical object generated by the predictive engine;
    wherein the predictive outcome generated by the predictive engine is generated by the predictive engine based at least in part upon (a) at least one of a set of parameters associated with the digital model or information derived from the set of parameters, and (b) one or more neural network machine learning models, at least one of the one or more neural network machine learning models trained using a collection of digital models of a domain of mechanical objects;
    wherein the at least one predictive outcome corresponds to one or more of the following: predicted cost, set-up time, cycle time, a number of Computer Numerical Control (CNC) operations, requirement of a mill machine, requirement of a lathe machine, requirement of a sheet metal process, a type of blank used, or a type of fixture used; and
    wherein the manufacturing feasibility outcome for the physical object is predicted by the predictive engine using the identified fabrication parameter.

* * * * *